(12) United States Patent
Kim

(10) Patent No.: US 12,198,589 B2
(45) Date of Patent: Jan. 14, 2025

(54) ELECTRONIC DEVICE AND METHOD FOR CONTROLLING PIXELS CORRESPONDING TO SENSOR

(71) Applicant: Samsung Electronics Co., Ltd., Suwon-si (KR)

(72) Inventor: Hongjun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/334,816

(22) Filed: Jun. 14, 2023

(65) Prior Publication Data
US 2024/0194104 A1    Jun. 13, 2024

Related U.S. Application Data

(63) Continuation of application No. PCT/KR2023/007165, filed on May 25, 2023.

(30) Foreign Application Priority Data

Jul. 1, 2022 (KR) .................. 10-2022-0081121
Sep. 8, 2022 (KR) .................. 10-2022-0114548

(51) Int. Cl.
G09G 3/00     (2006.01)
H04N 23/60    (2023.01)

(52) U.S. Cl.
CPC .......... *G09G 3/035* (2020.08); *G09G 2354/00* (2013.01); *H04N 23/60* (2023.01)

(58) Field of Classification Search
CPC .... G09F 9/301; G06F 1/1652; H04M 1/0268; G09G 2380/02; G09G 3/035
See application file for complete search history.

(56) References Cited

U.S. PATENT DOCUMENTS 11,127,797 B2    9/2021    Shin et al.
11,233,890 B2    1/2022    Ding
(Continued)

FOREIGN PATENT DOCUMENTS

CN    112153287 A       12/2020
CN    112700725 A  *    4/2021    ............. G09F 9/301
(Continued)

OTHER PUBLICATIONS

Search Report dated Sep. 15, 2023 in International Patent Application No. PCT/KR2023/007165.
(Continued)

*Primary Examiner* — Koosha Sharifi-Tafreshi
(74) *Attorney, Agent, or Firm* — Nixon & Vanderhye, P.C.

(57) ABSTRACT

An example electronic device includes a flexible display, a first housing, a second housing, a hinge structure, a first region, and a display region including a second region surrounding the first region, a first sensor, a second sensor in the first housing, and a processor. The processor is configured to identify an angle change between the first surface of the first housing and the third surface of the second housing from a first angle to a second angle, identify a second set of pixels among the pixels in the first region corresponding to the second angle from reference data, deactivate the second set of identified pixels, and activate the remaining pixels except for the second set of pixels.

20 Claims, 12 Drawing Sheets

(56) References Cited

U.S. PATENT DOCUMENTS

| | | |
|---|---|---|
| 11,442,684 B2 | 9/2022 | Choi et al. |
| 11,601,537 B2 | 3/2023 | An et al. |
| 11,611,058 B2 | 3/2023 | Chen et al. |
| 11,706,520 B2 | 7/2023 | Gummadi et al. |
| 11,908,415 B2 | 2/2024 | Youn et al. |
| 2020/0212357 A1 | 7/2020 | Lim et al. |
| 2021/0297563 A1 | 9/2021 | Manea et al. |
| 2022/0321748 A1 | 10/2022 | Lee et al. |
| 2023/0185507 A1 | 6/2023 | Lee et al. |
| 2023/0251552 A1 | 8/2023 | Cao |
| 2024/0303021 A1 | 9/2024 | Kim et al. |

FOREIGN PATENT DOCUMENTS

| | | | | |
|---|---|---|---|---|
| CN | 113888961 A | | 1/2022 | |
| CN | 111554188 B | * | 4/2022 | ............. G09F 9/301 |
| EP | 4083980 A1 | | 11/2022 | |
| EP | 4102810 A1 | | 12/2022 | |
| KR | 10-2018-0064575 | | 6/2018 | |
| KR | 10-2020-0100926 | | 8/2020 | |
| KR | 10-2020-0122076 | | 10/2020 | |
| KR | 10-2021-0035528 | | 4/2021 | |
| KR | 20210099822 A | | 8/2021 | |
| KR | 10-2021-0150903 | | 12/2021 | |
| KR | 10-2022-0017152 | | 2/2022 | |
| KR | 10-2022-0037755 | | 3/2022 | |
| KR | 10-2022-0114424 | | 8/2022 | |
| KR | 10-2023-0026425 | | 2/2023 | |
| KR | 10-2023-0088690 | | 6/2023 | |
| KR | 10-2024-0038057 | | 3/2024 | |

OTHER PUBLICATIONS

Written Opinion dated Sep. 15, 2023 in International Patent Application No. PCT/KR2023/007165.

Office Action dated Aug. 7, 2024 in KR Application No. 10-2022-0114548 and English-language translation.

* cited by examiner

ELECTRONIC DEVICE AND METHOD FOR CONTROLLING PIXELS CORRESPONDING TO SENSOR

CROSS-REFERENCE TO RELATED APPLICATIONS

This application is a continuation of International Application No. PCT/KR2023/007165 designating the United States, filed on May 25, 2023, in the Korean Intellectual Property Receiving Office and claiming priority to Korean Patent Application No. 10-2022-0081121 filed on Jul. 1, 2022 in the Korean Intellectual Property Office, and to KR Patent Application No. 10-2022-0114548 filed on Sep. 8, 2022 in the Korean Intellectual Property Office. The disclosures of each of these applications are incorporated by reference herein in their entireties.

BACKGROUND

Field

The disclosure relates to an electronic device and a method for controlling pixels corresponding to a sensor.

Description of Related Art

There is an increasing need for an electronic device capable of changing a size of a display for displaying content so that a user may receive various contents through the electronic device. For example, the electronic device may provide a structure capable of changing the size of the display for displaying the content as it includes a foldable flexible display. For another example, the electronic device may provide a structure capable of expanding or contracting the display for displaying the content as a housing moves.

SUMMARY

A sensor for providing various functions to a user may be disposed below a display. One region of a display corresponding to a position of the sensor may have a lower pixel density than another region of the display for operation of the sensor. Since one region of the display relatively moves with respect to the sensor due to a change in a shape of the display, a size of the one region of the display may be larger than that of the sensor. The larger the size of the one region of the display, the more noticeable a difference in appearance due to the different pixel density between the one region of the display and the other region of the display. An electronic device may need a method for reducing the difference in appearance according to the pixel density between the one region of the display and the other region of the display.

The technical problems to be achieved in this document are not limited to those described above, and other technical problems not mentioned herein will be clearly understood by those having ordinary knowledge in the art to which the present disclosure belongs, from the following description.

According to an embodiment, an electronic device may include a first housing including a first surface and a second surface opposite to the first surface. According to an embodiment, the electronic device may include a second housing including a third surface and a fourth surface opposite to the third surface. According to an embodiment, the electronic device may include a hinge structure rotatably connecting the first housing and the second housing. According to an embodiment, the electronic device may include a flexible display including a display region including a first region including pixels with a first density and a second region including pixels with a second density bigger than the first density and surrounding the first region, and disposed on the first surface and the third surface across the hinge structure. According to an embodiment, the electronic device may include a first sensor, a second sensor within the first housing disposed below the first region, and a processor. According to an embodiment, the processor may identify, through the first sensor, an angle change between the first surface and the third surface from a first angle to a second angle, while a first set of pixels among the pixels in the first region is disabled for driving the second sensor. According to an embodiment, the processor may identify a second set of pixels corresponding to the second angle among the pixels in the first region, from reference data for an alignment between the pixels to be disabled and the second sensor in the first region moved with respect to the second sensor according to change of the angle. According to an embodiment, the processor may be configured to deactivate the identified the second set of pixels and activate remaining pixels except for the second set of pixels among the pixels in the first region.

According to an embodiment, an electronic device may include a first housing, a second housing coupled to the first housing to be slidable with respect to the first housing. According to an embodiment, the electronic device may include a flexible display including a display region including a first region including pixels with a first density and a second region including pixels with a second density higher than the first density and surrounding the first region, the display region being contracted when the second housing slides into the first housing and being expanded when the second housing slides out from the first housing. According to an embodiment, the electronic device may include a first sensor, a second sensor disposed below the first region within the second housing; and a processor. According to an embodiment, the processor may identify that a position change of the second housing with respect to the first housing from a first position to a second position through the first sensor while a first set of pixels among the pixels in the first region is disabled for driving the second sensor. According to an embodiment, the processor may identify a second set of pixels corresponding to the second position among the pixels in the first region from reference data for an alignment between the pixels to be disabled and the second sensor in the first region moved with respect to the second sensor according to change of the position. According to an embodiment, the processor may be configured to deactivate the identified the second set of pixels and activate remaining pixels except for the second set of pixels among the pixels in the first region.

The electronic device according to an embodiment can provide a method for reducing a difference in appearance according to pixel density between one region of a display corresponding to a sensor and other region of the display by deactivating a part of pixels corresponding to the sensor based on movement of the housings.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
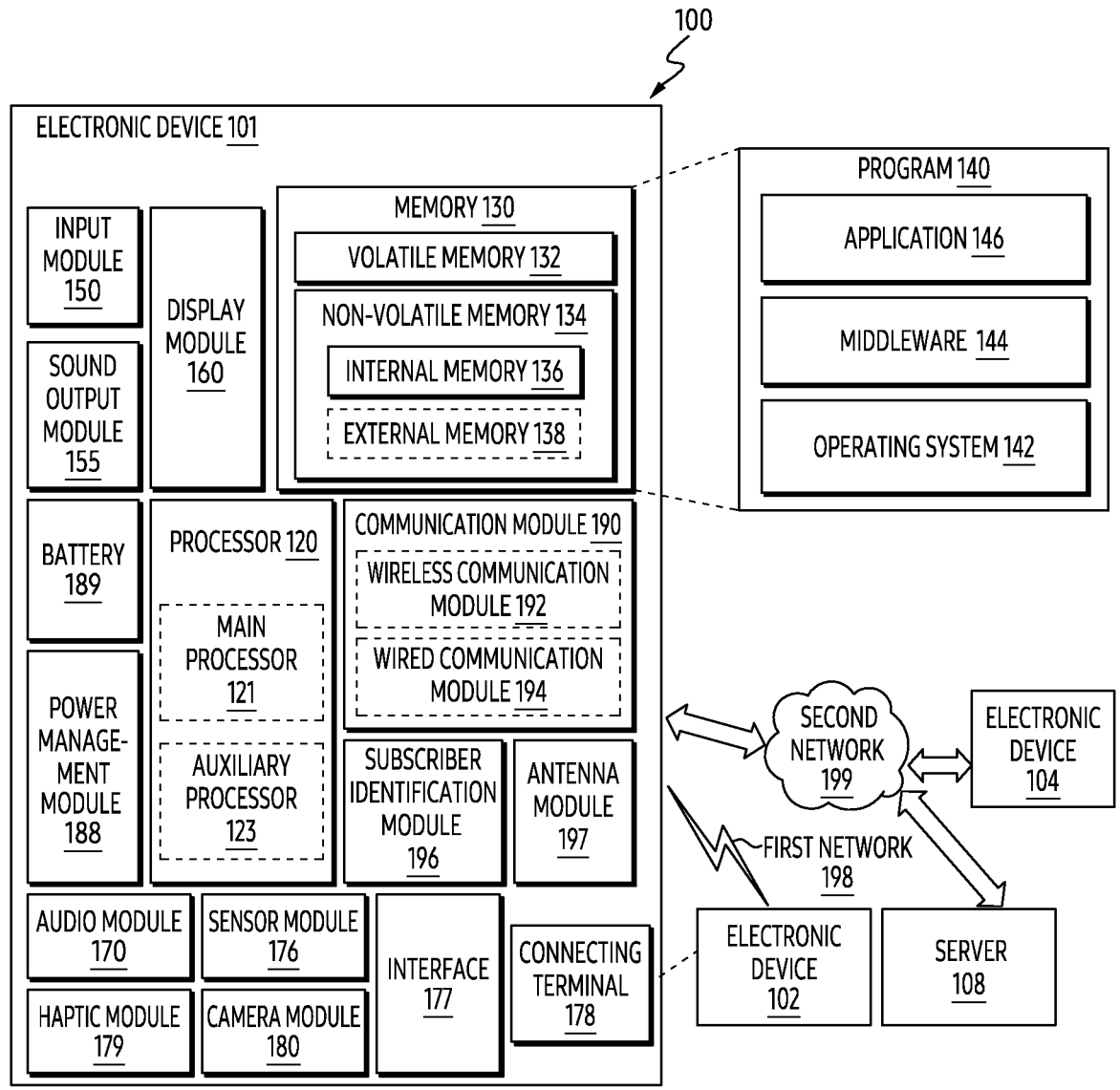
FIG. 1 is a block diagram of an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
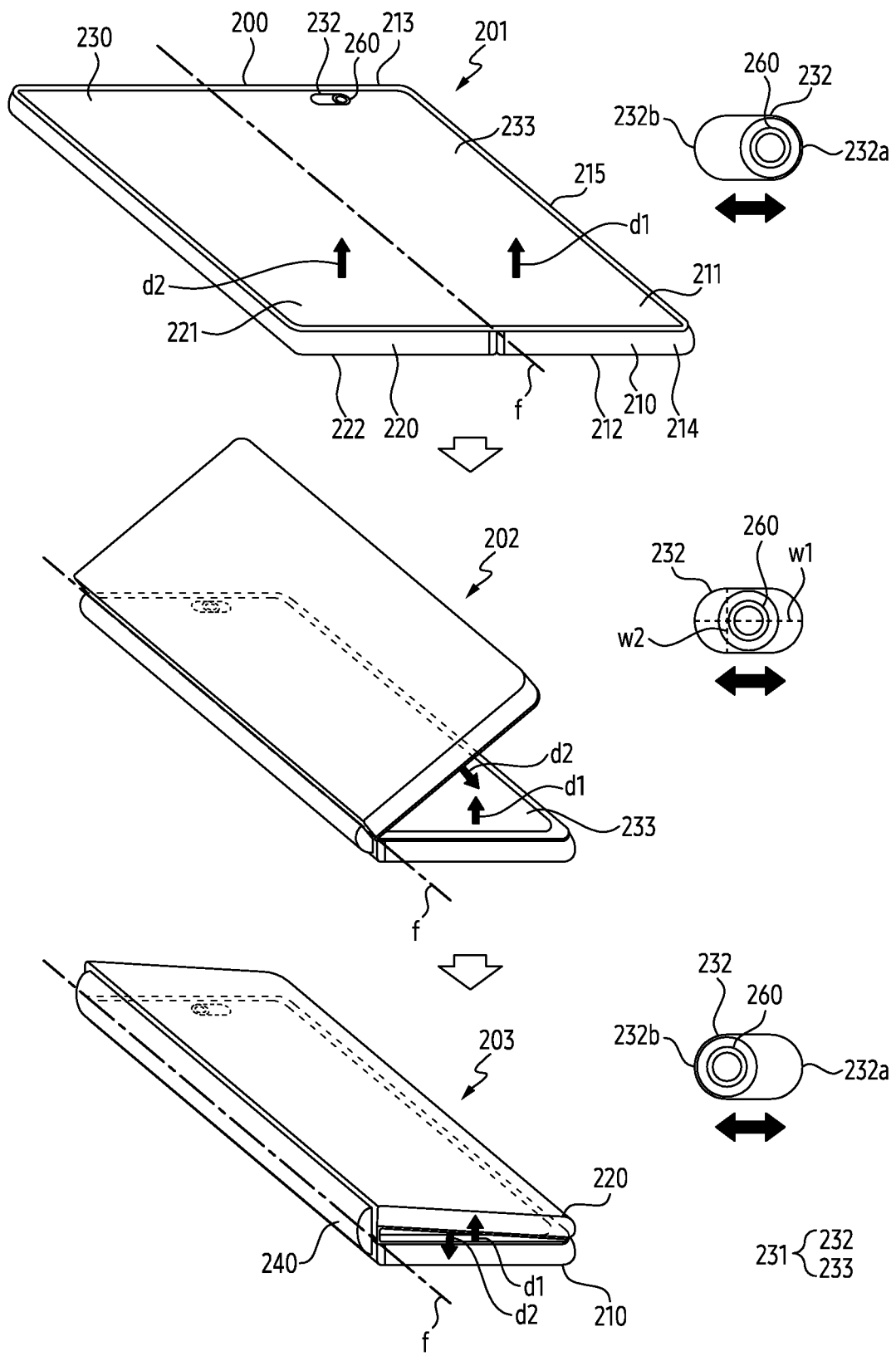
FIG. 2A is a perspective view of an example electronic device according to an embodiment.
Figure 2B:
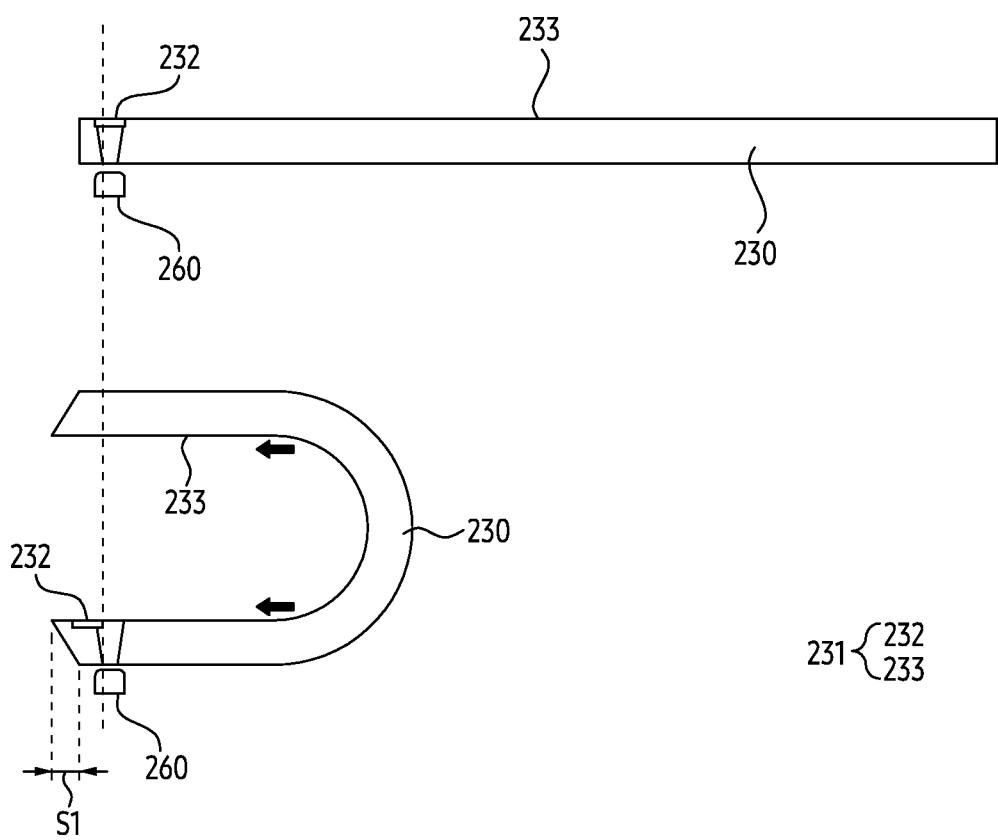
FIG. 2B an example in which a flexible display is deformed according to movement of a housing of an example electronic device according to an embodiment.
Figure 2C:
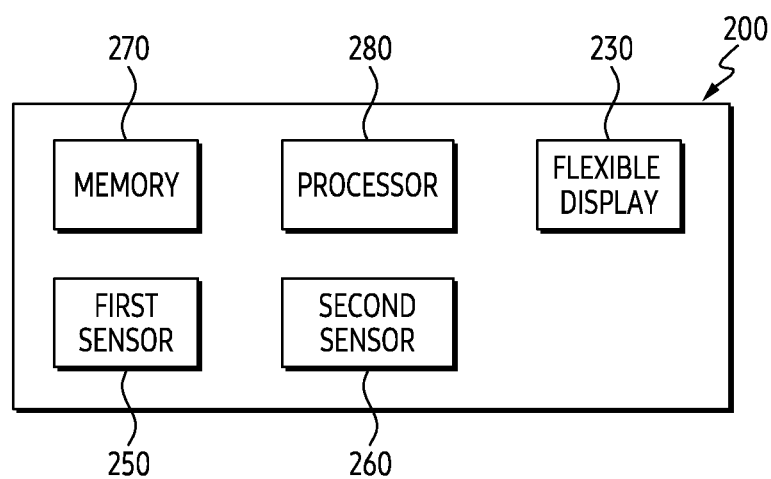
FIG. 2C is a simplified block diagram of an example electronic device according to an embodiment.

FIG. 2A is a perspective view of an example electronic device according to an embodiment. FIG. 2B illustrates an example in which a flexible display is deformed according to movement of a housing of an example electronic device according to an embodiment. FIG. 2C is a simplified block diagram of an example electronic device according to an embodiment.

Referring to FIGS. 2A, 2B, and 2C, according to an embodiment, an electronic device 200 may include some or all of the components of an electronic device 101 illustrated in FIG. 1. The electronic device 200 according to an embodiment may include a first housing 210, a second housing 220, a flexible display 230 (e.g., a display module 160 of FIG. 1), a hinge structure 240, a first sensor 250, a second sensor 260, a memory 270 (e.g., a memory 130 of FIG. 1), and/or a processor 280 (e.g., a processor 120 of FIG. 1).

The first housing 210 and the second housing 220 may define at least a part of an outer surface of the electronic device 200. The first housing 210 and the second housing 220 may contact a user's body when the electronic device 200 is gripped by the user. According to an embodiment, the first housing 210 and the second housing 220 may define an inner space for disposing various components of the electronic device 200. According to an embodiment, the first housing 210 may include a first surface 211 and a second surface 212 opposite to the first surface 211. A direction in which the second surface 212 faces may be opposite to a direction in which the first surface 211 faces. For example, a part of the components disposed within the electronic device 200 may be disposed between the first surface 211 and the second surface 212. The second surface 212 may face the first surface 211 and may be spaced apart from the first surface 211.

According to an embodiment, the second housing 220 may be coupled to the first housing 210 so as to be movable with respect to the first housing 210. For example, the second housing 220 may be coupled to the first housing 210 so as to be rotatable with respect to the first housing 210. For another example, the second housing 220 may be coupled to the first housing 210 to be pivotable with respect to the first housing 210. According to an embodiment, the second housing 220 may be rotatable with respect to the first housing 210 based on a folding axis f. According to an embodiment, the second housing 220 may include a third surface 221 and a fourth surface 222 opposite to the third surface 221. A direction in which the fourth surface 222 faces may be opposite to a direction in which the third surface 221 faces. For example, another part of the components disposed within the electronic device 200 may be disposed between the third surface 221 and the fourth surface 222. The fourth surface 222 may face the third surface 221 and may be spaced apart from the third surface 221.

The flexible display 230 may be configured to provide visual information to the user. The flexible display 230 may be electrically connected to a display driving circuit (not illustrated) for controlling an operation of the flexible display 230. The display driving circuit may receive image information including image data or an image control signal corresponding to a command for controlling the image data. For example, the image information may be received from the processor 280. The flexible display 230 may operate under the control of the display driving circuit that has received the control signal from the processor 280. According to an embodiment, the flexible display 230 may be disposed on the first housing 210, the second housing 220, and the hinge structure 240. For example, the flexible display 230 may be disposed on the first surface 211 of the first housing 210 and the third surface 221 of the second housing 220, and may cross the hinge structure 240. According to an embodiment, the flexible display 230 may be deformed by movement of the second housing 220 with respect to the first housing 210. For example, the flexible display 230 may be foldable by the movement of the second housing 220 with respect to the first housing 210. As the flexible display 230 is folded, a size of a display region 231 visible from the outside of the electronic device 200 may change.

According to an embodiment, the display region 231 of the flexible display 230 may refer to at least a part of the flexible display 230 capable of providing content to the user. For example, the display region 231 may include a plurality of pixels configured to emit light in the direction in which the first surface 211 faces and/or in the direction in which the third surface 221 faces, so as to provide content to the user. According to an embodiment, the display region 231 may include a first region 232 and a second region 233. The first region 232 may include a plurality of pixels with a first density. According to an embodiment, the first region 232 may be disposed on the first housing 210. For example, the first region 232 may be disposed close to a first periphery 213 among the first periphery 213 of the first housing 210 perpendicular to the folding axis f, a second periphery 214 of the first housing 210 perpendicular to the folding axis f, and a third periphery 215 connecting the first periphery 213 and the second periphery 214. However, it is not limited thereto, and the first region 232 may be disposed on the second housing 220. The second region 233 may include a plurality of pixels with a second density greater than the first density. According to an embodiment, the second region 233 may be connected to the first region 232. For example, the second region 233 may surround at least a part of the first region 232.

The hinge structure 240 may connect the first housing 210 and the second housing 220. For example, the hinge structure 240 may rotatably connect the first housing 210 and the second housing 220. According to an embodiment, the hinge structure 240 may change a state of the electronic device 200. For example, by the movement of the second housing 220 through the hinge structure 240, the electronic device 200 may be changed to an unfolded state 201 in which a first direction d1 in which the first surface 211 of the first housing 210 faces and a second direction d2 in which the third surface 221 of the second housing 220 faces are the same each other. For another example, by the movement of the second housing 220 through the hinge structure 240, the electronic device 200 may be changed to a folded state 203 in which the first direction d1 in which the first surface 211 faces and the second direction d2 in which the third surface 221 faces are opposite to each other. For still another example, by the movement of the second housing 220 through the hinge structure 240, the electronic device 200 may be changed to an intermediate state 202 in which the first direction d1 in which the first surface 211 faces and the second direction d2 in which the third surface 221 faces are inclined with respect to each other. The intermediate state 202 of the electronic device 200 may be referred to as a flex state or a flex mode. According to an embodiment, in the folded state 203 of the electronic device 200, the first surface 211 and the third surface 221 may face each other, but it is not limited thereto. In the following description, embodiments are described based on an in-folding structure in which the first surface 211 and the third surface 221 face each other within the folded state 203 of the electronic device 200, but this is for convenience of the description. According to embodiments, the electronic device 200 may be implemented as an out-folding structure in which the first surface 211 and the third surface 221 do not face each other and are exposed to the outside of the electronic device 200 in the folded state 203 of the electronic device 200.

The first sensor 250 may be configured to obtain information for identifying a change in the state of the electronic device 200. According to an embodiment, the first sensor 250 may be configured to detect the movement of the second housing 220 with respect to the first housing 210. For example, the first sensor 250 may be configured to obtain information on an angle between the first housing 210 and the second housing 220. The angle between the first housing 210 and the second housing 220 may correspond to an angle between the first direction d1 in which the first surface 211 faces and the second direction d2 in which the third surface 221 faces. For another example, the first sensor 250 may be configured to obtain information on a relative position of the second housing 220 with respect to the first housing 210. According to an embodiment, the first sensor 250 may be disposed in at least one of the first housing 210 and the second housing 220. For example, the first sensor 250 may be disposed in at least one of the inside of the first housing 210 and the inside of the second housing 220. For another example, the first sensor 250 may be disposed in at least one of the first housing 210 and the second housing 220 so as to be exposed to the outside of the electronic device 200. According to an embodiment, the first sensor 250 may obtain information on the movement of the second housing 220 with respect to the first housing 210 by identifying an electromagnetic change. For example, the first sensor 250 may include a strain sensor whose resistance changes when the second housing 220 moves with respect to the first housing 210. For another example, the first sensor 250 may include a hall sensor for detecting a change in a magnitude of a magnetic field that changes when the second housing 220 moves with respect to the first housing 210. According to an embodiment, the first sensor 250 may be configured to identify a change in acceleration and/or angular velocity that changes according to the movement of the second housing 220 with respect to the first housing 210. For example, the first sensor 250 may include an acceleration sensor for detecting a change in acceleration of the first housing 210 and/or the second housing 220. For another example, the first sensor 250 may include a gyro sensor for detecting a change in angular velocity of the first housing 210 and/or the second housing 220.

The second sensor 260 may be configured to obtain information for providing various functions to the user of the electronic device 200. According to an embodiment, the second sensor 260 may be configured to generate the information based on receiving light transmitted from the outside of the electronic device 200. For example, the second sensor 260 may include an image sensor configured to obtain an image from an external subject of the electronic device 200.

For another example, the second sensor 260 may be referred to as a camera (e.g., a camera module 180 of FIG. 1) or an optical sensor. According to an embodiment, the second sensor 260 may be disposed below the flexible display 230. For example, the second sensor 260 may be disposed below the first region 232 of the flexible display 230. For another example, the second sensor 260 may overlap the first region 232 when the flexible display 230 is viewed from above. The second sensor 260 may smoothly obtain the information from the outside of the electronic device 200 in a state in which interference by a plurality of pixels of the flexible display 230 is minimized as it overlaps the first region 232 having a relatively low pixel density. According to an embodiment, the second sensor 260 may be disposed within the first housing 210, but it is not limited thereto. According to embodiments, the second sensor 260 may be disposed within the second housing 220.

According to an embodiment, the second sensor 260 may be driven based on a user's input. For example, in a case that the second sensor 260 includes an image sensor, the second sensor 260 may be driven based on a user's input for requesting obtaining an image. For another example, the second sensor 260 may be driven in response to an input of an executable object for executing a first software application providing use of the second sensor 260 displayed in the display region 231. The first software application providing use of the second sensor 260 may have, for example, a shape corresponding to a shape of the second sensor 260. For another example, the second sensor 260 may be driven in response to a user's input pressing a physical button (not illustrated) disposed in the first housing 210 or the second housing 220. For still another example, the second sensor 260 may be driven in response to an input of an executable object for executing a function providing the use of the second sensor 260 displayed within a user interface of a second software application within the display region 231. The second software application may display the user interface including one or more objects providing various functions other than an object for driving the second sensor 260 within the display region 231.

According to an embodiment, the memory 270 may be configured to record data necessary for implementing various functions of the electronic device 200. For example, the memory 270 may store data necessary for an operation of the processor 280 and/or data obtained based on an operation performed by the processor 280. For another example, the memory 270 may store one or more instructions executed when the processor 280 operates. For still another example, the memory 270 may include software (e.g., a program 140 of FIG. 1) and input data or output data for a command related to the software. For example, the memory 270 may include at least one of volatile memory and non-volatile memory, but it is not limited thereto. According to embodiments, the memory 270 may be a non-transitory computer-readable recording medium.

According to an embodiment, the processor 280 may perform arithmetic processing for providing various functions of the electronic device 200 to the user. The processor 280 may be operatively coupled to the memory 270, the flexible display 230, the first sensor 250, and/or the second sensor 260. For example, the processor 280 may control the operation of the flexible display 230 through a display driving circuit (DDI) (not illustrated) electrically connected to the flexible display 230. According to an embodiment, the processor 280 may include a hardware component for processing data based on one or more instructions. The hardware component for processing data may include, for example, an Arithmetical and Logic Unit (ALU), a Field Programmable Gate Array (FPGA), and/or a Central Processing Unit (CPU).

According to an embodiment, the processor 280 may deactivate at least some of pixels in the first region 232 in response to receiving a signal requesting driving of the second sensor 260. For example, the processor 280 may deactivate pixels overlapping the second sensor 260 among pixels in the first region 232 in response to the driving of the second sensor 260. That pixels are deactivated may refer to pixels not emitting light for a designated period. That pixels are activated may refer to pixels emitting light for providing visual information to the user. For example, as some of the pixels in the first region 232 are deactivated while the second sensor 260 is driven, the second sensor 260 may not be interfered with by light emitted by the pixels.

According to an embodiment, the first region 232 may have a non-circular shape. For example, a first width w1 of the first region 232 perpendicular to the folding axis f may be longer than a second width w2 of the first region 232 parallel to the folding axis f. For another example, the first region 232 may be elliptical. According to an embodiment, a curvature of the flexible display 230 may be changed by the movement of the second housing 220 with respect to the first housing 210. For example, the flexible display 230 may include a plurality of layers stacked on each other. The curvature of each of a plurality of layers of the flexible display 230 may be changed by the movement of the second housing 220 with respect to the first housing 210. For example, when the state of the electronic device 200 is changed from the unfolded state 201 to the folded state 203, the flexible display 230 may be bent to have the curvature. Within the folded state 203 of the electronic device 200, the plurality of layers of the flexible display 230 may be bent to have different curvature. As the plurality of layers have different curvature, slip S1 (FIG. 2B) of the flexible display 230 may occur. By the slip S1 of the flexible display 230, the first region 232 may relatively move with respect to the second sensor 260. For example, by the movement of the second housing 220, the first region 232 may move in a direction perpendicular to the folding axis f with respect to the second sensor 260. In a case that the first region 232 and the second sensor 260 are misaligned, the second sensor 260 may not be able to obtain information from the outside of the electronic device 200 due to interference by a plurality of pixels of the flexible display 230. In order to prevent misalignment of the first region 232 and the second sensor 260 due to the relative movement of the first region 232, in a case that a size of the first region 232 increases, a difference in appearance due to a difference in pixel density between the first region 232 and the second region 233 may be remarkable or more apparent. The electronic device 200 according to an example embodiment may provide a structure capable of securing an operating performance of the second sensor 260 while reducing the difference in appearance due to the difference in pixel density between the first region 232 and the second region 233 by the first region 232 having the a-circular shape. For example, within the unfolded state 201 of the electronic device 200, the second sensor 260 may overlap one end 232a of the first region 232. For another example, within the folded state of the electronic device 200, the second sensor 260 may overlap the other end 232b of the first region 232. As the first region 232 has the non-circular shape, the first region 232 may have a reduced size as compared to a case in which the first region 232 is a circular shape having the first width w1 as a diameter. As the size of the first region 232 is reduced, the difference in appearance due to the difference in pixel density between the first region 232 and the second region 233 may be reduced.

According to an embodiment, when the second sensor 260 is driven, the processor 280 may deactivate a portion overlapping the second sensor 260 among the plurality of pixels in the first area 232. For example, the processor 280 may deactivate a first set of pixels corresponding to a position of the second sensor 260 among the plurality of pixels in the first region 232. The first set of pixels may refer to pixels overlapping the second sensor 260 when the angle between the first housing 210 and the second housing 220 is a first angle, among the plurality of pixels included in the first region 232. According to an embodiment, the processor 280 may identify the movement of the second housing 220 with respect to the first housing 210 through the first sensor 250 while a part of the plurality of pixels are deactivated. For example, the processor 280 may identify that an angle between the first surface 211 of the first housing 210 and the third surface 221 of the second housing 220 is changed from the first angle to a second angle while the first set of pixels among the plurality of pixels in the first region 232 is deactivated for driving of the second sensor 260.

According to an embodiment, for alignment of the first region 232 with respect to the second sensor 260, the processor 280 may identify a second set of pixels overlapping the second sensor 260 among the plurality of pixels in the first region 232 as the angle between the first housing 210 and the second housing 220 is changed from the first angle to the second angle. For example, an operation of identifying the second set of pixels by the processor 280 may be described in detail with reference to FIG. 3. In the following description, the first angle and the second angle may refer to an arbitrary angle selected within a range in which the angle between the first housing 210 and the second housing 220 may be changed. In other words, the first angle and the second angle may be intended to indicate a change of the angle between the first housing 210 and the second housing 220, and may not be intended to indicate a size of the angle. In the following description, the first set of pixels may refer to the pixels overlapping the second sensor 260 when the angle between the first housing 210 and the second housing 220 is the first angle, among the pixels in the first region 232. The second set of pixels may refer to the pixels overlapping the second sensor 260 when the angle between the first housing 210 and the second housing 220 is the second angle, among the pixels in the first region 232.

Figure 3:
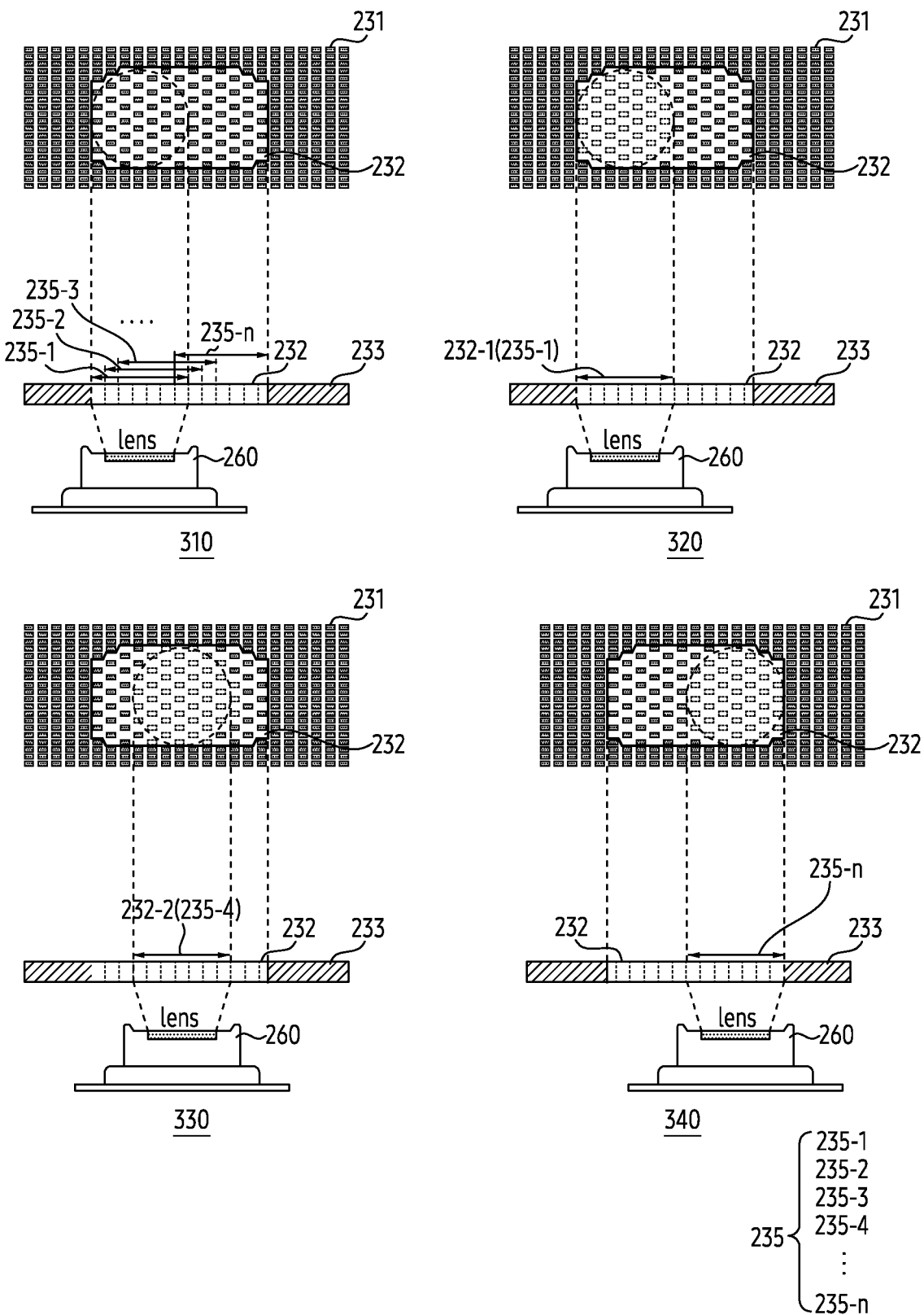
FIG. 3 an example in which an electronic device according to an embodiment controls pixels in a first region based on a relative position of the first region and a second sensor.

FIG. 3 illustrates an example in which an example electronic device according to an embodiment controls pixels in a first region based on a relative position of the first region and a second sensor.

Referring to FIG. 3, according to an embodiment, in a first state 310 of the electronic device (e.g., an electronic device 200 of FIGS. 2A and 2C), a plurality of pixels in a display region 231 (e.g., the display region 231 of FIG. 2A) may be activated. For example, in the first state 310, the plurality of pixels included in a first region 232 and a second region 233 may be activated. For another example, in the first state 310, a second sensor 260 may be in a deactivated state.

According to an embodiment, in a second state 320, a processor (e.g., a processor 280 of FIG. 2C) may deactivate a first set 232-1 of pixels overlapping the second sensor 260 among the plurality of pixels in the first region 232 in response to driving of the second sensor 260. The second state 320 may refer to when an angle between a first housing (e.g., a first housing 210 of FIG. 2A) and a second housing (e.g., a second housing 220 of FIG. 2A) is a first angle. For example, the processor 280 may identify the first set 232-1 of pixels corresponding to the first angle based on reference data. The reference data may be used for alignment of the pixels within the first region 232 with the second sensor 260. The reference data may be previously stored in a memory (e.g., a memory 270 of FIG. 2C) before changing the angle between the first housing 210 and the second housing 220. For example, the reference data may include a plurality of reference sets 235 corresponding to each of a plurality of reference angles within a range in which the angle between the first housing 210 and the second housing 220 may be changed. For example, each of the plurality of reference sets 235 may correspond to the pixels in the first region 232 overlapping the second sensor 260 among the pixels in the first region 232 when the angle between the first housing 210 and the second housing 220 is one of the plurality of reference angles. For an example, the reference data may be expressed as shown in Table 1 below.

TABLE 1

| reference angles | reference sets 235 |
| --- | --- |
| first reference angle | first reference Set 235-1 |
| second reference angle | second reference Set 235-2 |
| third reference angle | third reference set 235-3 |
| ... | ... |
| nth reference angle | nth reference set 235-n |

In Table 1 above, a first reference angle, a second reference angle, a third reference angle, . . . , and a nth reference angle may refer to an arbitrary angle within the range in which the angle between the first housing 210 and the second housing 220 may be changed, and reference sets 235 may refer to the pixels in the first region 232 overlapping the second sensor 260 when the angle between the first housing 210 and the second housing 220 is one of the plurality of reference angles. For example, when the angle between the first housing 210 and the second housing 220 is the first reference angle, the first reference set 235-1 among the pixels in the first region 232 may overlap the second sensor 260. For another example, when the angle between the first housing 210 and the second housing 220 is the nth reference angle, the nth reference set 235-n among the pixels in the first region 232 may overlap the second sensor 260.

According to an embodiment, in the second state 320, the processor 280 may identify that the angle between the first housing 210 and the second housing 220 is the first angle based on receiving a signal requesting driving of the second sensor 260. The processor 280 may identify whether the first angle corresponds to one of the plurality of reference angles recorded in the reference data. For example, the processor 280 may identify that the first angle corresponds to the first reference angle among the plurality of reference angles recorded in the reference data. The processor 280 may identify the first reference set 235-1 corresponding to the first angle from the reference data based on identifying that the first angle corresponds to the first reference angle. The processor 280 may identify the first reference set 235-1 as the first set 232-1 of pixels to be deactivated when the angle between the first housing 210 and the second housing 220 is the first angle. The processor 280 may deactivate the first set 232-1 of pixels among the plurality of pixels in the first region 232 based on identifying the first set 232-1 of pixels. The processor 280 may activate remaining pixels except for the first set 232-1 of pixels among the plurality of pixels in the first region 232 based on identifying the first set 232-1 of pixels.

According to an embodiment, in a third state 330 of the electronic device 200, the angle between the first housing 210 and the second housing 220 may be changed from the first angle to a second angle. The processor 280 may identify that the angle between the first housing 210 and the second housing 220 is changed from the first angle to the second angle through a first sensor (e.g., a first sensor 250 of FIG. 2C). The processor 280 may identify a second set 232-2 of pixels, among the pixels in the first region 232, from the reference data for alignment of the second sensor 260 and pixels to be disabled in the first area 232 moving with respect to the second sensor 260 according to the change of the angle of the first housing 210 and the second housing 220. The second set 232-2 of pixels may refer to the pixels overlapping the second sensor 260 among the pixels in the first region 232 when the angle between the first housing 210 and the second housing 220 is the second angle. For example, the processor 280 may identify that the second angle corresponds to a fourth reference angle among the plurality of reference angles recorded in the reference data. The processor 280 may identify a fourth reference set 235-4 corresponding to the second angle from the reference data based on identifying that the second angle corresponds to the fourth reference angle. The processor 280 may identify the fourth reference set 235-4 as the second set 232-2 of pixels to be disabled when the angle between the first housing 210 and the second housing 220 is the second angle. The processor 280 may activate remaining pixels except for the second set 232-2 of pixels among the plurality of pixels in the first region 232 based on identifying the second set 232-2 of pixels. For example, as the second housing 220 moves with respect to the first housing 210, the first region 232 may move relatively with respect to the second sensor 260. Since a size of a cross-section of the first region 232 is larger than a size of a cross-section of the second sensor 260, in a case that all the plurality of pixels in the first region 232 are deactivated, a size of the display region (e.g., the display region 231 of FIGS. 2A and 2B) may be reduced. The electronic device 200 according to an embodiment may provide a method capable of expanding the display region 231 since only some of the plurality of pixels in the first region 232 are deactivated. The electronic device 200 according to an embodiment may provide the method capable of expanding the display region 231 regardless of the angle between the first housing 210 and the second housing 220 since the deactivated pixels are changed based on the angle between the first housing 210 and the second housing 220. However, it is not limited thereto, and according to embodiments, the processor 280 may not deactivate the second set 232-2 of pixels. For example, the processor 280 may control the second set 232-2 of pixels so that the second set 232-2 of pixels displays a designated image. For example, the designated image may be a black image. For example, the processor 280 may control brightness of the second set 232-2 of pixels to be different from the brightness of the rest among the pixels in the first region 232. For example, the brightness of the second set 232-2 of pixels may be lower than that of the rest of the pixels in the first region 232.

According to an embodiment, after the angle between the first housing 210 and the second housing 220 is changed from the first angle to the second angle, the processor 280 may differently control a part overlapping the second sensor 260, among the pixels in the first area 232, when the angle between the first housing 210 and the second housing 220 is the first angle, unlike another part of the pixels in the first area 232. For example, after the angle between the first housing 210 and the second housing 220 is changed from the first angle to the second angle, the processor 280 may lower the brightness of a part of the pixels in the first area 232 overlapping the second sensor 260 when the angle between the first housing 210 and the second housing 220 is the first angle relative to the brightness of the remaining parts except for the second set 232-2 of the pixels in the first area 232. For example, after the angle between the first housing 210 and the second housing 220 is changed from the first angle to the second angle, the processor 280 may blink some of the pixels in the first region 232 overlapping the second sensor 260 when the angle between the first housing 210 and the second housing 220 is the first angle.

According to an embodiment, while the angle between the first housing 210 and the second housing 220 is changed, the processor 280 may differently control among the pixels in the first region 232, a part to be overlapped with the second sensor 260 according to a change in the angle between the first housing 210 and the second housing 220, from another part of the pixels in the first region 232. For example, the processor 280 may lower the brightness of a part that will be overlapped with the second sensor 260 of the pixels in the first area 232 relative to the brightness of the remaining parts of the pixels in the first area 232, according to the change in the angle between the first housing 210 and the second housing 220. For example, the processor 280 may control a part to be overlapped with the second sensor 260 to flash according to the change in the angle between the first housing 210 and the second housing 220, among the pixels in the first region 232. For example, while the angle between the first housing 210 and the second housing 220 is changed, the state of the electronic device 200 may be changed from the third state 330 to a fourth state 340. The processor 280 may control a part of a nth reference data 235-n to be overlapped with the second sensor 260 to flash in the fourth state 340. The processor 280 may lower the brightness of the nth reference data 235-n to be overlapped with the second sensor 260 in the fourth state 340 relative to the brightness of another part of the pixels in the first region 232. According to an embodiment, the processor 280 may identify a velocity at which the angle between the first housing 210 and the second housing 220 is changed from the first angle to the second angle through the first sensor 250.

According to an embodiment, based on identifying that a velocity of change from the first angle to the second angle is more than a first reference velocity, while changing from the first angle to the second angle, the processor 280 may identify a part of the first region 232 having a size larger than that of the second sensor 260 as the second set 232-2 of pixels. When the velocity of the change from the first angle to the second angle is a first velocity equal to or greater than the first reference velocity, the processor 280 may deactivate the part of the first region 232 having the size larger than that of the second sensor 260. For example, the size of the second set 232-2 of pixels identified when the velocity of change from the first angle to the second angle is equal to or greater than the first reference velocity may be greater than the size of the second set 232-2 of pixels identified when the velocity of change from the first angle to the second angle is less than the first reference velocity. For example, when changing from the second state 320 to the third state 330, the processor 280 may identify that the velocity of change from the first angle to the second angle is the first velocity greater than the first reference velocity. Based on identifying that the velocity of change is the first velocity, the processor 280 may identify the part of the first region 232 having a size larger than one reference set among the plurality of reference sets 235 as the second set 232-2 of pixels. Based on identifying that the velocity of change is the first velocity, the processor 280 may identify two or more reference sets as the second set 232-2 of pixels. For example, based on identifying that the velocity of change is the first velocity, the processor 280 may identify the second reference set 235-2 and the third reference set 235-3 as the second set 232-2 of pixels. According to an embodiment, when the velocity of change from the first angle to the second angle is equal to or greater than the first reference velocity, as the velocity of change increases, the size of the second set 232-2 of pixels identified by the processor 280 may increase. For example, when the velocity of change from the first angle to the second angle is a second velocity greater than the first velocity, the first reference set 235-1, the second reference set 235-2, and the third reference set 235-3 may be identified as the second set 232-2 of pixels.

According to an embodiment, based on identifying that the velocity of change from the first angle to the second angle is equal to or greater than a second reference velocity, the processor 280 may deactivate all pixels of the first region 232 while being changed from the first angle to the second angle. The second reference velocity may be equal to or greater than the first reference velocity. For example, based on identifying that the velocity of change from the first angle to the second angle is a third velocity equal to or greater than the second reference velocity, the processor 280 may deactivate all pixels of the first region 232 while changing from the first angle to the second angle. For example, based on identifying that the velocity of change from the first angle to the second angle is equal to or greater than the second reference velocity, the processor 280 may be configured to refrain from identifying the second set 232-2 of pixels. Based on identifying that the change to the second angle is complete, the processor 280 may be configured to identify the second set 232-2 of pixels corresponding to the second angle. For example, in the second state 320, among the plurality of pixels in the first region 232, the first set 232-1 of pixels may be deactivated, and the remaining pixels except for the first set 232-1 of pixels may be activated. In a case that a velocity of the angle change between the first housing 210 and the second housing 220 is equal to or greater than a designated velocity, while the state of the electronic device 200 is changed from the second state 320 to the third state 330, the second sensor 260 may overlap activated pixels among pixels of the first region 232. In a case that the second sensor 260 overlaps the activated pixel while the state of the electronic device 200 changes from the second state 320 to the third state 330, the light emitted by the activated pixel may interfere with the operation of the second sensor 260. The electronic device 200 according to an embodiment may provide a method capable of securing an operating performance of the second sensor 260 since it deactivates at least a part of a plurality of the pixels in the first region 232 when the velocity of the angle change between the first housing 210 and the second housing 220 is equal to or greater than the reference velocity (e.g., the first reference velocity and/or the second reference velocity). As described above, the electronic device 200 according to an embodiment may provide the method capable of expanding the display region 231 regardless of the movement of the second housing 220, since part of the plurality of the pixels are deactivated based on the relative position of the second sensor 260 with respect to the first region 232.

Figure 4:
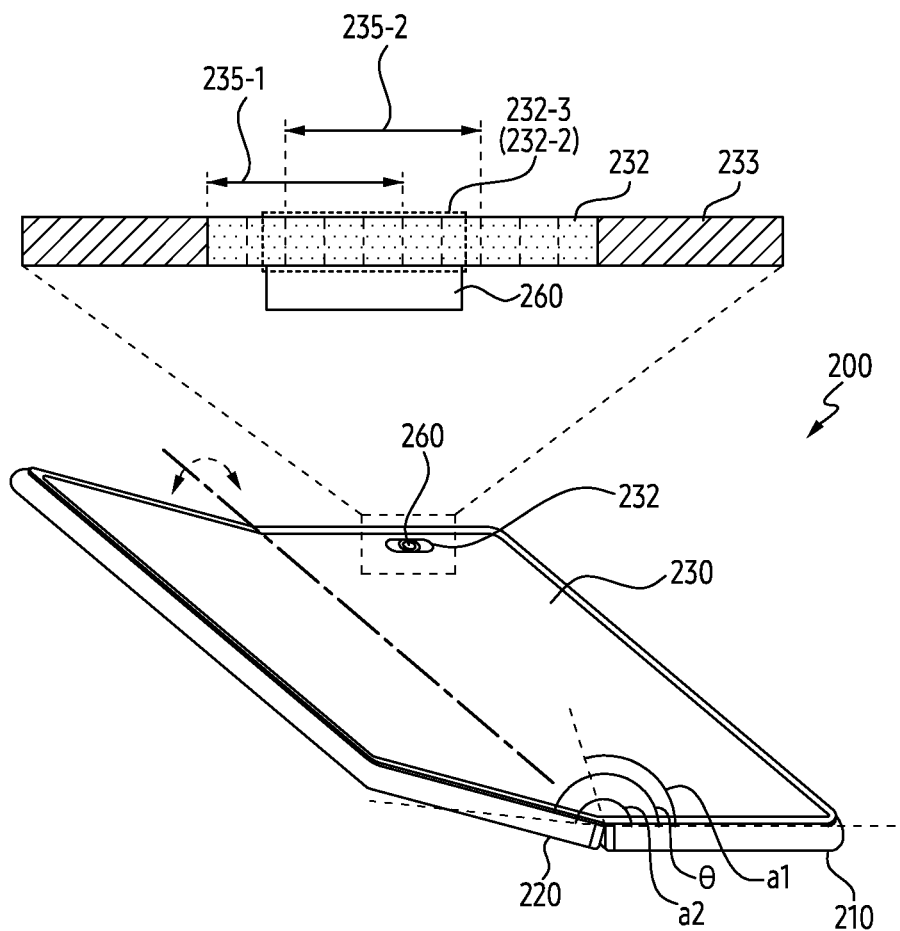
FIG. 4 illustrates an example in which an electronic device according to an embodiment controls pixels in a first region based on an angle between a first housing and a second housing.

FIG. 4 illustrates an example in which an electronic device according to an embodiment controls pixels in a first region based on an angle between a first housing and a second housing.

Referring to FIG. 4, according to an embodiment, when the angle θ between the first housing 210 and the second housing 220 is changed from a first angle to a second angle, the second angle may be different from a plurality of reference angles recorded in a memory (e.g., a memory 270 of FIG. 2C). For example, the angle θ between the first housing 210 and the second housing 220 may be between a first reference angle a1 and a second reference angle a2. For example, the first reference angle a1 may correspond to a first reference set 235-1 of a plurality of reference sets 235, and the second reference angle a2 may correspond to a second reference set 235-2 of the plurality of reference sets 235. In response to identifying through the first sensor 250 that the angle θ between the first housing 210 and the second housing 220 is between the first reference angle a1 and the second reference angle a2, a processor (e.g., a processor 280 of FIG. 2C) may identify a third set 232-3 of pixels in a first region 232 distinct from the plurality of reference sets 235. Based on a difference between the first reference angle a1 and the second angle and a difference between the second reference angle a2 and the second angle, the processor 280 may identify a first weight to be applied to the first reference set 235-1 and a second weight to be applied to the second reference set 235-2. In a case that the difference between the first reference angle a1 and the second angle is larger than the difference between the second reference angle a2 and the second angle, the second weight may be set higher than the first weight. In a case that the difference between the first reference angle a1 and the second angle is smaller than the difference between the second reference angle a2 and the second angle, the second weight may be set smaller than the first weight.

According to an embodiment, the processor 280 may obtain the third set 232-3 of pixels based on the first weight, the second weight, a position of the first reference set 235-1, and a position of the second reference set 235-2. The processor 280 may identify the third set 232-3 of pixels as a second set 232-2 of pixels. For example, when the second angle θ of the first housing 210 and the second housing 220 has a value between the first reference angle a1 and the second reference angle a2, the third set 232-3 obtained based on the weight may correspond to pixels overlapping the second sensor 260 among pixels in the first region 232. The processor 280 may deactivate the third set 232-3 of pixels among the pixels in the first region 232 based on identifying the third set 232-3 of pixels. The processor 280 may activate the remaining pixels except for the third set 232-3 of pixels among the pixels in the first region 232 based on identifying the third set 232-3 of pixels.

According to an embodiment, a function of identifying the third set 232-3 of pixels distinct from the plurality of reference sets 235 may be executed when the second sensor 260 operates after movement of the second housing 220 is stopped. For example, in a case that the second sensor 260 includes an image sensor, the function of identifying the third set 232-3 may be executed after the movement of the second housing 220 is stopped.

According to an embodiment, the function of identifying the third set 232-3 of pixels distinct from the plurality of reference sets 235 may be executed when the second sensor 260 operates while the second housing 220 moves. For example, in a case that the second sensor 260 includes the image sensor, the function of identifying the third set 232-3 of pixels may be executed based on identifying a change in the angle between the first housing 210 and the second housing 220 while the video is obtained through the second sensor 260.

As described above, the electronic device 200 according to an embodiment may provide a method of reducing interference of the second sensor 260 and pixels in various situations by the function of identifying the third set 232-3 of pixels.

Figure 5:
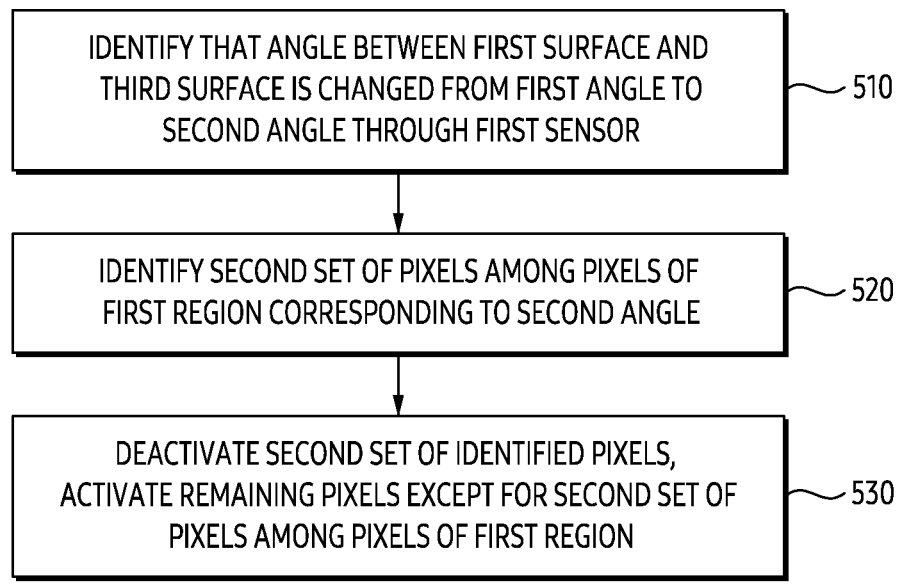
FIG. 5 illustrates an example of an operation of a processor of an example electronic device, according to an embodiment.

FIG. 5 illustrates an example of an operation of a processor of an example electronic device, according to an embodiment.

The operations illustrated in FIG. 5 may be performed by an electronic device 200 illustrated in FIG. 2A, 2B, 2C, and/or FIG. 4.

Referring to FIG. 5, in operation 510, the processor (e.g., a processor 280 of FIG. 2C) may identify a change in angle between a first housing (e.g., a first housing 210 of FIG. 2A) and a second housing (e.g., a second housing 220 of FIG. 2A) through a first sensor (e.g., a first sensor 250 of FIG. 2C). The processor 280 may identify the change in the angle between the first housing 210 and the second housing 220 while a first set of pixels (e.g., a first set 232-1 of the pixels of FIG. 3) among pixels in a first region (e.g., a first region 232 of FIGS. 2A and 2B) is deactivated for driving a second sensor (e.g., a second sensor 260 of FIGS. 2A, 2B, and 2C). For example, the processor 280 may identify through the first sensor 250 that the angle between a first surface of the first housing 210 (e.g., a first surface 211 of FIG. 2A) and a third surface of the second housing 220 (e.g., a third surface 221 of FIG. 2A) is changed from a first angle to a second angle.

In operation 520, the processor 280 may identify a second set of pixels (e.g., a second set 232-2 of pixels of FIG. 3) corresponding to the second angle among pixels of the first region 232. For example, the processor 280 may identify an nth reference set (e.g., an nth reference set 235-n of FIG. 3) overlapping the second sensor 260 in a state in which the angle between the first housing 210 and the second housing 220 is the second angle among a plurality of pixels in the first region 232 from reference data recorded in a memory 270. The processor 280 may identify the nth reference set 235-n as the second set 232-2 of pixels to be deactivated when the angle between the first housing 210 and the second housing 220 is the second angle.

In operation 530, the processor 280 may deactivate the second set 232-2 of pixels among the pixels in the first region 232, and may activate the remaining pixels except for the second set 232-2 of pixels based on identifying the second set 232-2 of pixels.

Figure 6:
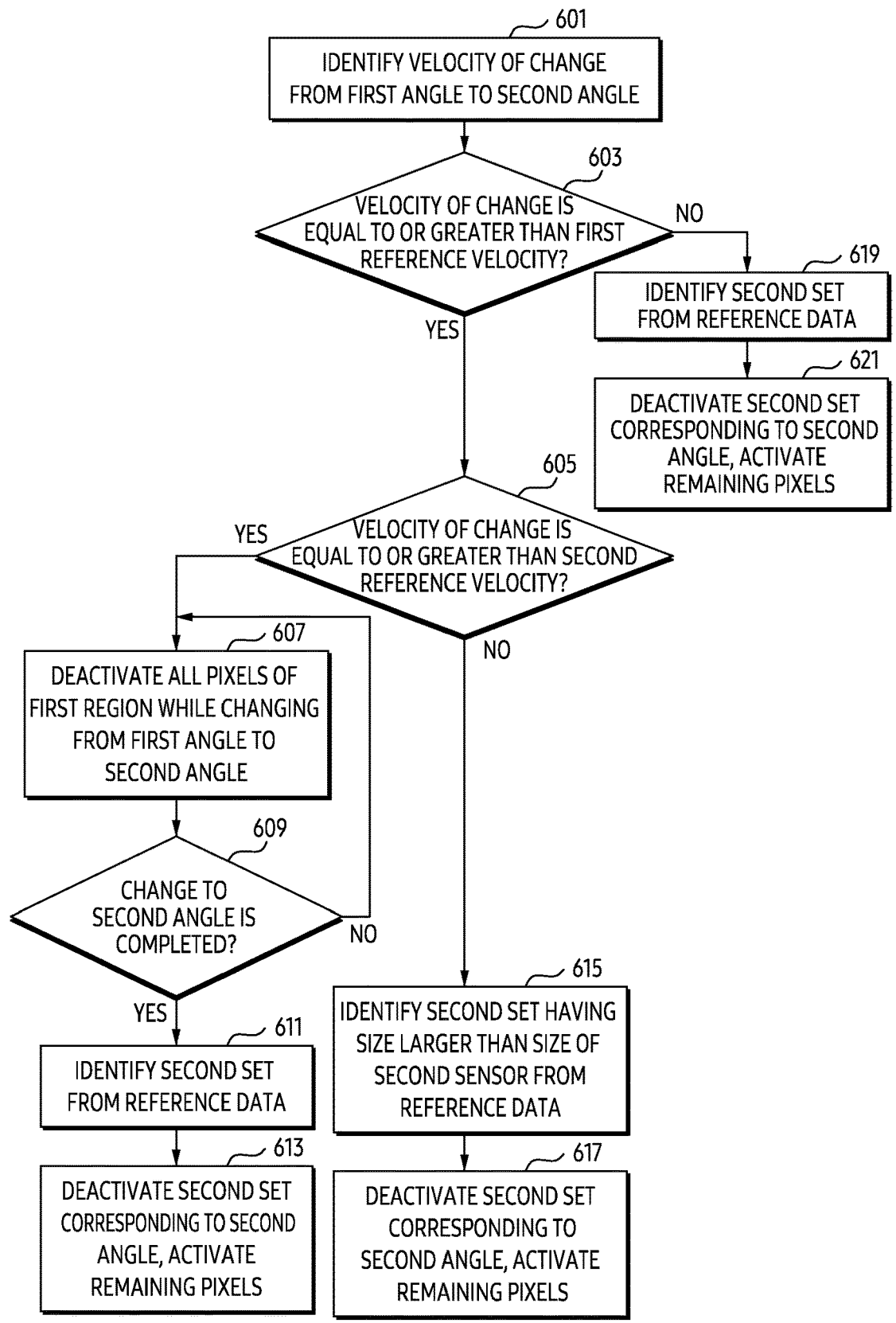
FIG. 6 an example of an operation of a processor of an example electronic device, according to an embodiment.

FIG. 6 illustrates an example of an operation of a processor of an example electronic device, according to an embodiment.

The operations illustrated in FIG. 6 may be performed by an electronic device 200 illustrated in FIG. 2A, 2B, 2C, and/or FIG. 4.

Referring to FIG. 6, in operation 601, the processor (e.g., a processor 280 of FIG. 2C) may identify a change in angle between a first housing (e.g., a first housing 210 of FIG. 2A) and a second housing (e.g., a second housing 220 of FIG. 2A) through a first sensor (e.g., a first sensor 250 of FIG. 2C). The processor 280 may identify a velocity of angle change between a first surface (e.g., a first surface 211 of FIG. 2A) of the first housing 210 and a third surface (e.g., a third surface 221 of FIG. 2A) of the second housing 220 through the first sensor 250.

In operation 603, the processor 280 may identify whether the velocity of angle change between the first surface 211 and the third surface 221 is equal to or greater than a first reference velocity. For example, the processor 280 may identify whether the velocity of angle change between the first surface 211 and the third surface 221 identified through the first sensor 250 is equal to or greater than the first reference velocity recorded in a memory (e.g., a memory 270 of FIG. 2C).

In operation 605, the processor 280 may identify whether the velocity of angle change between the first surface 211 and the third surface 221 is equal to or greater than a second reference velocity. The second reference velocity may refer to a velocity greater than the first reference velocity. For example, the processor 280 may identify whether the velocity of angle change between the first surface 211 and the third surface 221 identified through the first sensor 250 is equal to or greater than the second reference velocity recorded in the memory 270.

In operation 607, based on identifying that the velocity of angle change between the first housing 210 and the second housing 220 is equal to or greater than the second reference velocity, the processor 280 may deactivate all pixels in a first region (e.g., a first region 232 of FIGS. 2A and 2B) while an angle between the first housing 210 and the second housing 220 is changed from a first angle to a second angle. For example, when the angle between the first housing 210 and the second housing 220 is the first angle, the processor 280 may deactivate a first set of pixels (e.g., a first set 232-1 of pixels of FIG. 3) overlapping a second sensor (e.g., a second sensor 260 of FIGS. 2A, 2B, and 2C) among pixels of the first region 232. Based on identifying that the velocity of angle change between the first housing 210 and the second housing 220 is equal to or greater than the second reference velocity, the processor 280 may deactivate all pixels in the first region 232 including the first set 232-1 of pixels. According to an embodiment, based on identifying that the velocity of angle change between the first housing 210 and the second housing 220 is equal to or greater than the second reference velocity, while the angle between the first housing 210 and the second housing 220 is changed from the first angle to the second angle, the processor 280 may refrain from identifying a second set of pixels (e.g., a second set 232-2 of pixels of FIG. 3). For example, based on identifying that the velocity of angle change between the first housing 210 and the second housing 220 is equal to or greater than the second reference velocity, while the angle between the first housing 210 and the second housing 220 is changed from the first angle to the second angle, the processor 280 may bypass identifying the second set 232-2 of pixels. For another example, based on identifying that the velocity of angle change between the first housing 210 and the second housing 220 is equal to or greater than the second reference velocity, while the angle between the first housing 210 and the second housing 220 is changed from the first angle to the second angle, the processor 280 may omit identifying the second set 232-2 of pixels.

In operation 609, the processor 280 may identify whether a change in the angle between the first housing 210 and the second housing 220 has been completed. For example, the processor 280 may identify whether the angle change between the first housing 210 and the second housing 220 has been completed by identifying the velocity of angle change between the first housing 210 and the second housing 220 through the first sensor 250. For another example, based on identifying that the movement of the second housing 220 with respect to the first housing 210 is stopped, the processor 280 may identify that the movement of the second housing 220 with respect to the first housing 210 is completed.

In operation 611, based on identifying that the change of angle between the first housing 210 and the second housing 220 has been completed, the processor 280 may identify the second set 232-2 of pixels corresponding to the second angle between the first housing 210 and the second housing 220.

In operation 613, based on identifying the second set 232-2 of pixels, the processor 280 may deactivate the second set 232-2 of pixels among the pixels in the first region 232, and may activate the remaining pixels except for the second set 232-2 of pixels.

In operation 615, based on identifying that the velocity of the angle change between the first housing 210 and the second housing 220 is equal to or greater than the first reference velocity and less than the second reference velocity, the processor 280 may identify the second set 232-2 of pixels having a size larger than that of second sensor 260. For example, based on identifying that the velocity of the angle change between the first housing 210 and the second housing 220 is equal to or greater than the first reference velocity and less than the second reference velocity, the processor 280 may identify the second set 232-2 of pixels having a size larger than that of second sensor 260 from reference data. According to an example embodiment, when the velocity of the change from the first angle to the second angle is equal to or greater than the first reference velocity and less than the second reference velocity, as the velocity of the change increases, a size of the second set 232-2 of pixels identified by the processor 280 may increase. For example, based on identifying that the velocity of the change is a first velocity, the processor 280 may identify the second set 232-2 of pixels having a first size. For example, based on identifying that the velocity of the change is a second velocity greater than the first velocity, the processor 280 may identify the second set 232-2 of pixels having a second size larger than the first size.

In operation 617, based on identifying the second set 232-2 of pixels larger than a size of the second sensor 260, the processor 280 may deactivate the second set 232-2 of pixels, and may activate the remaining pixels except for the second set 232-2 of pixels.

In operation 619, based on identifying that the velocity of angle change between the first housing 210 and the second housing 220 is less than the first reference velocity, the processor 280 may identify the second set 232-2 of pixels from the reference data recorded in the memory 270.

In operation 621, based on identifying the second set 232-2 of pixels, the processor 280 may deactivate the second set 232-2 of pixels, and may activate the remaining pixels except for the second set 232-2 of pixels.

Figure 7:
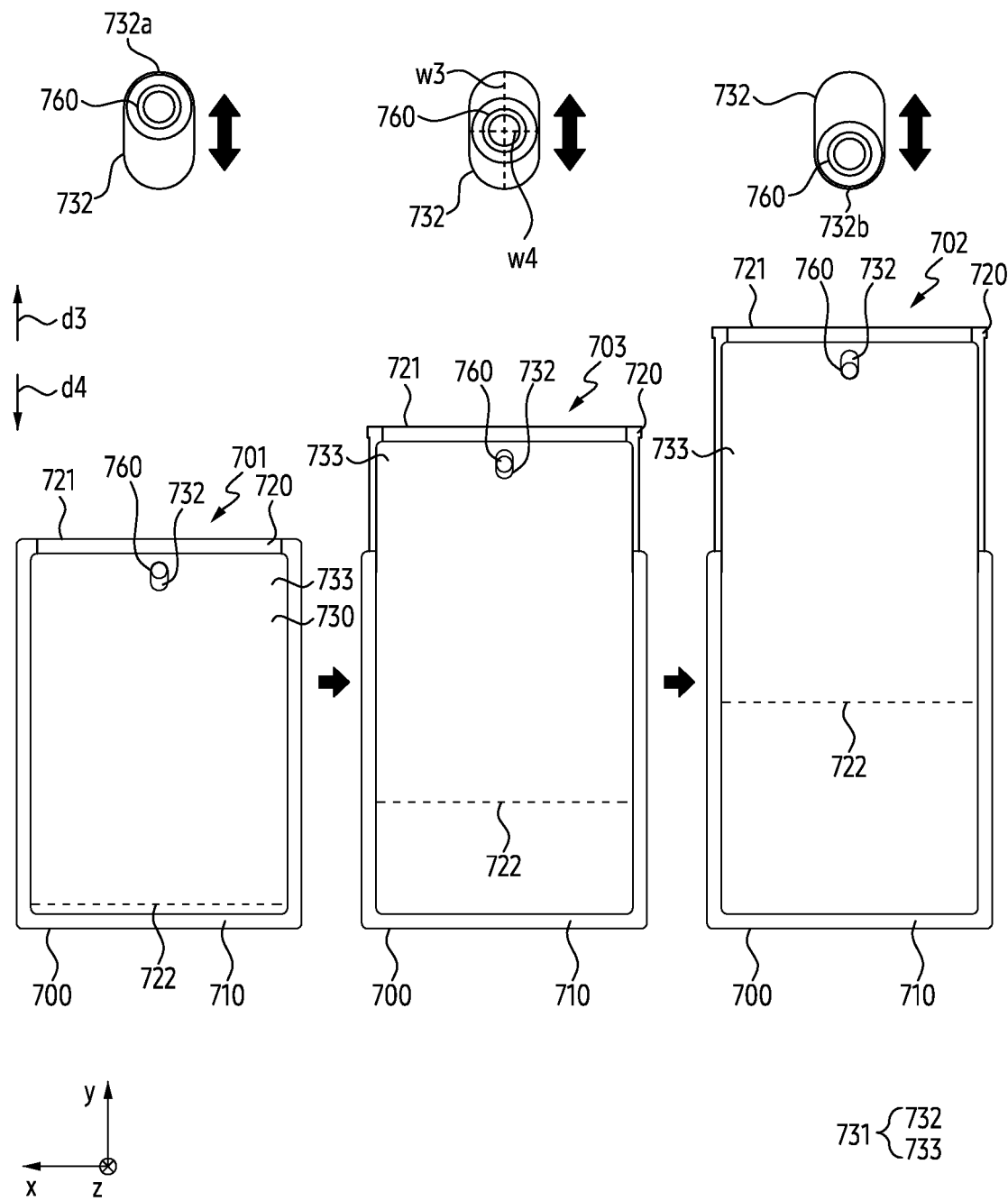
FIG. 7 is a top plan view of an example electronic device according to an embodiment.

FIG. 7 is a top plan view of an example electronic device according to an embodiment.

Referring to FIG. 7, an electronic device 700 (e.g., an electronic device 200 of FIG. 2C) according to an embodiment may include a first housing 710, a second housing 720, a flexible display 730 (e.g., a flexible display 230 of FIGS. 2A, 2B, and 2C), and/or a second sensor 760 (e.g., a second sensor 260 of FIGS. 2A, 2B, and 2C). The electronic device 700 illustrated in FIG. 5 may be another example of the electronic device 200 of FIG. 2C.

The first housing 710 and the second housing 720 may define at least a part of an outer surface of the electronic device 700. According to an embodiment, the first housing 710 may surround at least a part of the second housing 720. The second housing 720 may be coupled to the first housing 710 to be movable with respect to the first housing 710. For example, the second housing 720 may be coupled to the first housing 710 to be slidable with respect to the first housing 710. The electronic device 700 may be referred to as a "slidable electronic device" as the second housing 720 is designed to be slidable with respect to the first housing 710. The electronic device 700 may be referred to as a "rollable electronic device" as at least a part of the flexible display 730 is designed to be wound inside the first housing 710 or the second housing 720 based on movement of the second housing 720. For another example, the second housing 720 may be coupled to the first housing 710 so as to be linearly movable with respect to the first housing 710. According to an embodiment, the second housing 720 may be inserted into the first housing 710 or may be extracted from the first housing 710. For example, as the second housing 720 moves in a third direction d3, the second housing 720 may be slid out from the first housing 710. For another example, as the second housing 720 moves in a fourth direction d4 opposite to the third direction d3, the second housing 720 may be slid into the first housing 710.

According to an embodiment, a state of the electronic device 700 may be changed by the movement of the second housing 720 with respect to the first housing 710. For example, in a slide-in state 701 of the electronic device 700, the second housing 720 may be movable in the third direction d3 of the third direction d3 and the fourth direction d4. In the slide-in state 701 of the electronic device 700, the second housing 720 may be movable only in the third direction d3 and may not be movable in the fourth direction d4. For another example, in the slide-in state 701 of the electronic device 700, a part of the second housing 720 may be extracted from the first housing 710, but may be not inserted into the first housing 710. The slide-in state 701 of the electronic device 700 may be referred to as a contracted state. In a slide-out state 702 of the electronic device 700, the second housing 720 may be movable in the fourth direction d4 of the third direction d3 and the fourth direction d4. In the slide-out state 702 of the electronic device 700, the second housing 720 may be movable only in the fourth direction d4 and may not be movable in the third direction d3. In the slide-out state 702 of the electronic device 700, a part of the second housing 720 may be inserted into the first housing 710, but may be not extracted from the first housing 710. The slide-out state 702 of the electronic device 700 may be referred to as an extended state. In an intermediate state 703 of the electronic device 700, the second housing 720 may be movable in the third direction d3 and the fourth direction d4. In the intermediate state 703 of the electronic device 700, a part of the second housing 720 may slide into the first housing 710 or may slide out from the first housing 710. The intermediate state 703 of the electronic device 700 may be referred to as a pre-stop state.

According to an embodiment, the movement of the second housing 720 with respect to the first housing 710 may be performed based on an external force transmitted from a user or a driving force by a driving module (not illustrated) disposed in the first housing 710 or the second housing 720. For example, an operation of the driving module may be triggered based on a user's input. According to an embodiment, the user input for triggering the operation of the driving module may include a touch input, a force touch input, and/or a gesture input through display 730. According to another embodiment, the user input for triggering the operation of the driving module may include an audio input (voice input), or an input to a physical button exposed to the outside of the first housing 710 or the second housing 720.

According to an embodiment, the operation of the driving module may be triggered in response to detecting an input by the external force of the user.

According to an embodiment, the flexible display 730 may include a display region 731, a first region 732, and a second region 733. Since the display region 731, the first region 732, and the second region 733 of FIG. 7 may be substantially the same as a display region 231, a first region 232, and a second region 233 of FIGS. 2A and 2C, overlapped descriptions will be omitted.

According to an embodiment, the flexible display 730 may be disposed in the second housing 720. The flexible display 730 may move together as the second housing 720 moves. In the flexible display 730, the display region 731 may be contracted according to the slide-in of the second housing 720 with respect to the first housing 710, or the display region 731 may be expanded according to the slide-out of the second housing 720 with respect to the first housing 710. For example, in the slide-in state 701 of the electronic device 700, the part of the flexible display 730 may have a curvature and may be bent, inside the first housing 710 and/or the second housing 720. As the second housing 720 moves in the third direction d3, the part of the flexible display 730 may be slid out from the inside of the first housing 710 and/or the second housing 720. A part of the extracted flexible display 730 may be visible from the outside of electronic device 700. As the part of the flexible display 730 is exposed to the outside, a size of the display region 731 visible from outside of the electronic device 700 may be increased. For another example, as the second housing 720 moves in the fourth direction d4, the part of the extracted flexible display 730 may be inserted into the first housing 710 and/or the second housing 720. Apart of the inserted flexible display 730 may not be visible from the outside of the electronic device 700. As the part of the flexible display 730 is not exposed to the outside, the size of the display region 731 visible from the outside of the electronic device 700 may be reduced.

According to an embodiment, the first region 732 may be disposed on the second housing 720. For example, the first region 732 may be close to a first periphery 721 among the first periphery 721 of the second housing 720 facing the third direction d3 and a second periphery 722 of the second housing 720 facing the fourth direction d4. However, it is not limited thereto. According to embodiments, the first region 732 may be close to the second periphery 722 among the first periphery 721 and the second periphery 722 of the second housing 720. The second periphery 722 of the second housing 720 may be covered by the flexible display 730 and may not be visible from the outside of the electronic device 700.

According to an embodiment, the second sensor 760 may be disposed below the flexible display 730. For example, the second sensor 760 may overlap the first region 732 when the flexible display 730 is viewed from above. According to an embodiment, the second sensor 760 may be disposed in the second housing 720. The second sensor 760 may be movable together with the second housing 720 by moving the second housing 720 with respect to the first housing 710. For example, the second sensor 760 may be close to the first periphery 721 among the first periphery 721 and the second periphery 722 of the second housing 720.

According to an embodiment, the first region 732 may have a non-circular shape. For example, a third width w3 of the first region 732 which is a width parallel to the third direction d3 may be longer than a fourth width w4 of the first region 732 which is a width perpendicular to the third direction d3. According to an embodiment, a curvature of the flexible display 730 may be changed by the movement of the second housing 720 with respect to the first housing 710. Due to the change in curvature caused by the movement of the second housing 720, slip of the flexible display 730 may occur. Due to the slip of the flexible display 730, the first region 732 may relatively move with respect to the second sensor 760 according to the movement of the second housing 720. For example, within the slide-in state of the electronic device 700, the second sensor 760 may overlap one end 732a of the first region 732. For another example, within the slide-out state of the electronic device 700, the second sensor 760 may overlap the other end 732b of the first region 732. As the first region 732 has the non-circular shape, the first region 732 may have a reduced size than in a case that the first region 732 is a circular shape having the third width w3 as diameter. As a size of the first region 732 is reduced, a difference in appearance due to a difference in pixel density between the first region 732 and the second region 733 may be reduced.

According to an embodiment, the electronic device 700 may further include a first sensor (e.g., a first sensor 250 of FIG. 2C), a memory (e.g., a memory 270 of FIG. 2C), and/or a processor (e.g., a processor 280 of FIG. 2C). According to an embodiment, the processor 280 may identify a position of the second housing 720 with respect to the first housing 710 through the first sensor 250. For example, the processor 280 may identify that the position of the second housing 720 with respect to the first housing 710 is changed from a first position to a second position. According to an embodiment, when the second sensor 760 is driven, the processor 280 may deactivate a part overlapping the second sensor 760 among a plurality of pixels in the first region 732. For example, when the position of the second housing 720 with respect to the first housing 710 is the first position, the processor 280 may deactivate a first set of pixels corresponding to a position of the second sensor 760 among the pixels in the first area region.

According to an embodiment, as the position of the second housing 720 with respect to the first housing 710 changes from the first position to the second position for alignment of the first region 732 with respect to the second sensor 760, the processor 280 may identify a second set of pixels overlapping the second sensor 760 among the plurality of pixels in the first region 732. For example, an operation of identifying the second set of pixels by the processor 280 may be described in detail with reference to FIG. 8.

Figure 8:
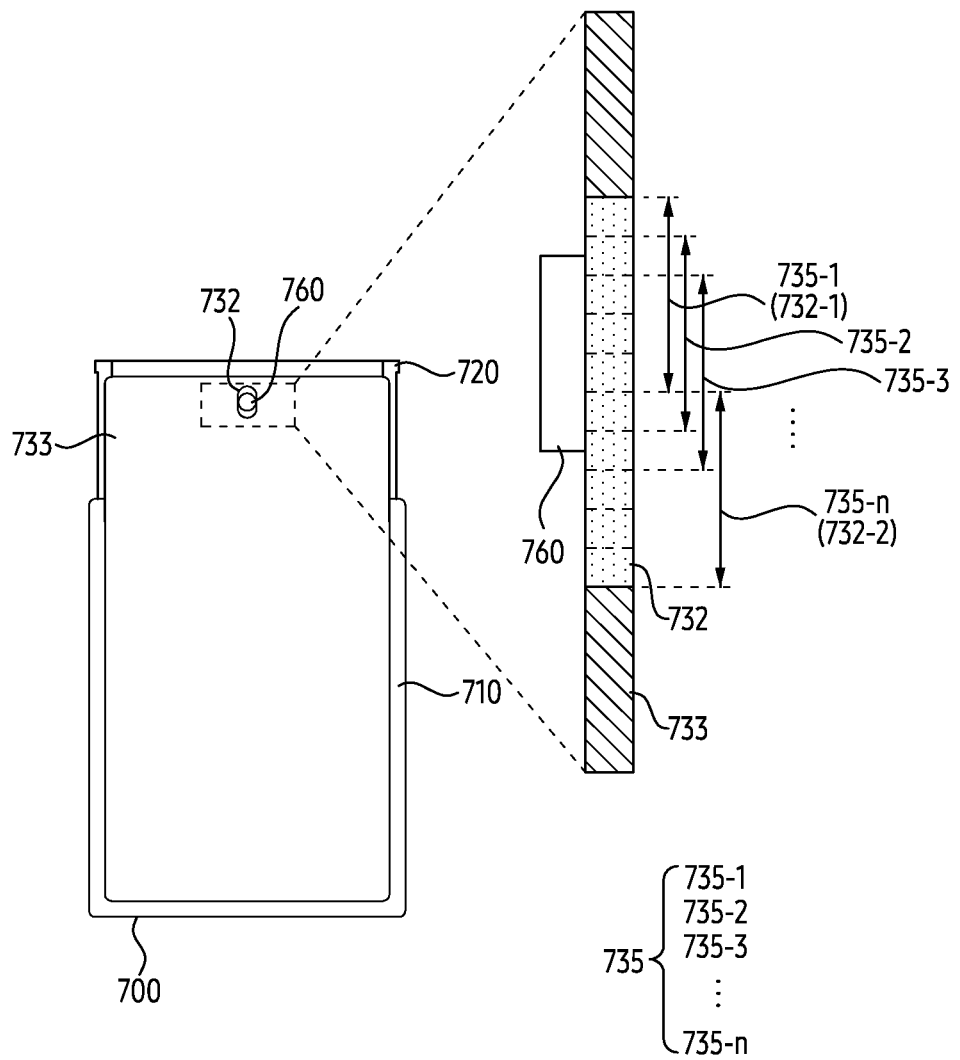
FIG. 8 an example in which an example electronic device according to an embodiment controls pixels in a first region based on a position of a second housing with respect to a first housing.

FIG. 8 illustrates an example in which an example electronic device according to an embodiment controls pixels in a first region based on a position of a second housing with respect to a first housing.

Referring to FIG. 8, according to an embodiment, a processor (e.g., a processor 280 of FIG. 2C) may identify a first set 732-1 of pixels overlapping a second sensor 760 among a plurality of pixels in a first region 732 when a position of a second housing 720 with respect to a first housing 710 is a first position. The processor 280 may identify the first set 732-1 of pixels corresponding to the first position through reference data recorded in a memory (e.g., a memory 270 of FIG. 2C) based on receiving a signal requesting driving of the second sensor 760. The reference data may include, for example, a plurality of reference sets 735 respectively corresponding to a plurality of reference positions within a moving range of the second housing 720 with respect to the first housing 710. Each of the plurality of reference sets 735 may correspond to pixels in the first region 732 overlapping the second sensor 760 among the pixels in the first region 732 when a position of the second housing 720 with respect to the first housing 710 is one of the plurality of reference positions. For example, when the position of the second housing 720 with respect to the first housing 710 is a first reference position, a first reference set 735-1 among the pixels in the first region 732 may overlap the second sensor 760. For another example, when the position of the second housing 720 with respect to the first housing 710 is a nth reference position, a nth reference set 735-n among the pixels in the first region 732 may overlap the second sensor 760.

According to an embodiment, the processor 280 may identify that the position of the second housing 720 with respect to the first housing 710 is the first position based on receiving the signal requesting driving of the second sensor 760. The processor 280 may identify whether the first position corresponds to one of the plurality of reference positions recorded in the reference data. For example, the processor 280 may identify that the first position corresponds to the first reference position among the plurality of reference positions. The processor 280 may identify the first reference set 735-1 corresponding to the first position from the reference data based on identifying that the first position corresponds to the first reference position. The processor 280 may identify the first reference set 735-1 as the first set 732-1 of pixels to be deactivated when the position of the second housing 720 with respect to the first housing 710 is the first position. According to an embodiment, the processor 280 may deactivate the first set 732-1 of pixels among the pixels in the first region 732, and may activate the remaining pixels except for the first set 732-1 of pixels based on identifying the first set 732-1 of pixels.

According to an embodiment, the processor 280 may identify that the position of the second housing 720 with respect to the first housing 710 is changed from the first position to a second position through a first sensor 250. For example, the processor 280 may identify that the position of the second housing 720 with respect to the first housing 710 has been changed from the first position to the second position based on receiving the signal requesting driving of the second sensor 760. The processor 280 may identify whether the second position corresponds to one of the plurality of reference positions recorded in the reference data. For example, the processor 280 may identify that the second position corresponds to the nth reference position among the plurality of reference positions. The processor 280 may identify the nth reference set 735-n corresponding to the second position from the reference data based on identifying that the second position corresponds to the nth reference position. The processor 280 may identify the nth reference set 735-n as a second set 732-2 of pixels to be deactivated when the position of the second housing 720 with respect to the first housing 710 is the second position. According to an embodiment, based on identifying the second set 732-2 of pixels, the processor 280 may deactivate the second set 732-2 of pixels among the pixels in the first region 732, and may activate the remaining pixels except for the second set 732-2 of pixels. However, it is not limited thereto, and according to embodiments, the processor 280 may not deactivate the second set 732-2 of pixels. For example, the processor 280 may control the second set of pixels 732-2 so that the second set of pixels 732-2 displays a designated image. For example, the designated image may be a black image. For example, the processor 280 may control brightness of the second set 732-2 of pixels differently from brightness of the rest among the pixels in the first region 732. For example, the brightness of the second set 732-2 of pixels may be lower than the brightness of the rest among the pixels in the first region 732.

According to an embodiment, after the position of the second housing 720 with respect to the first housing 710 is changed from the first position to the second position, the processor 280 may differently control a part overlapping the second sensor 760, among the pixels in the first area 732, when the position of the second housing 720 with respect to the first housing 710 is the first position, unlike another part of the pixels in the first area 732. For example, after the position of the second housing 720 with respect to the first housing 710 is changed from the first position to the second position, the processor 280 may lower brightness of a part overlapping the second sensor 760 when the position of the second housing 720 with respect to the first housing 710 is the first position among the pixels in the first region 732, than brightness of the remaining part except for the second set 732-2 of pixels among the pixels in the first region 732. For example, after the position of the second housing 720 with respect to the first housing 710 is changed from the first position to the second position, when the position of the second housing 720 with respect to the first housing 710 among the pixels in the first region 732 is the first position, the processor 280 may flash the part overlapping the second sensor 760.

According to an embodiment, while the position of the second housing 720 with respect to the first housing 710 is changed, the processor 280 may differently control a part of the pixels to be overlapped with the second sensor 760 according to the change in the position of the second housing 720 with respect to the first housing 710 among the pixels in the first region 732, from another part of the pixels in the first region 732. For example, the processor 280 may lower brightness of a part to be overlapped with the second sensor 760 according to the change in the position of the second housing 720 with respect to the first housing 710 among the pixels in the first region 732 than the brightness of another part of the pixels in the first region 732. For example, the processor 280 may control the part to be overlapped with the second sensor 760 to flash according to a change in the position of the second housing 720 with respect to the first housing 710 among the pixels in the first region 732.

According to an embodiment, the processor 280 may identify a moving velocity of the second housing 720 with respect to the first housing 710 through the first sensor 250. The processor 280 may identify whether the moving velocity of the second housing 720 with respect to the first housing 710 is equal to or greater than a reference velocity. According to an embodiment, based on identifying that the moving velocity of the second housing 720 with respect to the first housing 710 is equal to or greater than a third reference velocity, while the position of the second housing 720 with respect to the first housing 710 is changed from the first position to the second position, the processor 280 may identify a part of the first region 732 having a size larger than that of the second sensor 760 as the second set 732-2 of pixels. For example, based on identifying that the moving velocity of the second housing 720 with respect to the first housing 710 is equal to or greater than the third reference velocity, the processor 280 may identify the part of the first region 732 having the size larger than one reference set among the plurality of reference sets 735 as the second set 732-2 of pixels. For example, as the moving velocity of the second housing 720 with respect to the first housing 710 increases, a size of the second set 732-2 of pixels identified by the processor 280 may increase. According to an embodiment, based on identifying that the velocity changing from the first position to the second position is less than the third reference velocity, the processor 280 may identify the second set 732-2 of pixels from the reference data. When the velocity of change from the first position to the second position is less than the third reference velocity, the processor 280 may deactivate the second set 732-2 of pixels, and may activate the remaining pixels except for the second set 732-2 of pixels among the pixels in the first region 732.

According to an embodiment, based on identifying that the velocity of change from the first position to the second position is equal to or greater than a fourth reference velocity greater than the third reference velocity, the processor 280 may deactivate all pixels in the first region 732 while being changed from the first position to the second position. For example, based on identifying that the velocity of change from the first position to the second position is equal to or greater than a fourth reference velocity, the processor 280 may be configured to refrain from identifying the second set 732-2 of pixels. The processor 280 may be configured to identify the second set 732-2 of pixels corresponding to the second position based on identifying that the change to the second position is completed.

Figure 9:
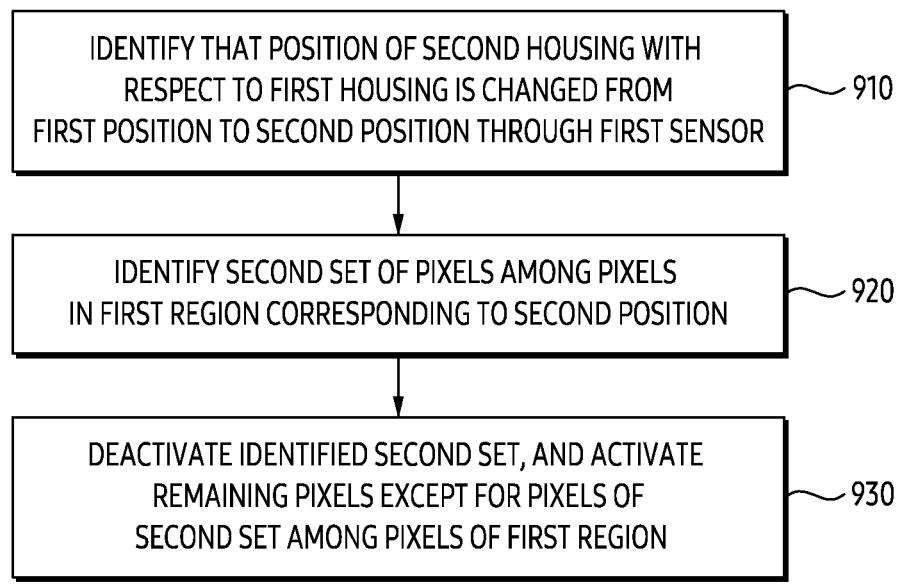
FIG. 9 an example of an operation of a processor of an example electronic device, according to an embodiment.

FIG. 9 illustrates an example of an operation of a processor of an example electronic device, according to an embodiment.

The operations of FIG. 9 may be performed by an electronic device 700 of FIG. 7 and/or FIG. 8.

Referring to FIG. 9, in operation 910, the processor (e.g., a processor 280 of FIG. 2C) may identify a change in position of a second housing (e.g., a second housing 720 of FIG. 7) with respect to a first housing (e.g., a first housing 710 of FIG. 7). For example, the processor 280 may identify that a position of the second housing 720 with respect to the first housing 710 is changed from a first position to a second position through a first sensor (e.g., a first sensor 250 of FIG. 2C). While a first set of pixels (e.g., a first set 732-1 of pixels of FIG. 8) is deactivated for driving a second sensor (e.g., a second sensor 760 of FIG. 7) among pixels in a first region (e.g., a first region 732 of FIG. 7), the processor 280 may identify a change in a position of the second housing 720 with respect to the first housing 710.

In operation 920, the processor 280 may identify a second set of pixels corresponding to the second position (e.g., a second set 732-2 of pixels of FIG. 8) among the pixels in the first region 732. For example, from reference data recorded in a memory (e.g., a memory 270 of FIG. 2C), the processor 280 may identify an nth reference set (e.g., an nth reference set 735-*n* of FIG. 8) overlapping the second sensor 760 in a state in which the position of the second housing 720 with respect to the first housing 710 is the second position among a plurality of pixels in the first region 732. The processor 280 may identify the nth reference set 735-*n* as the second set 732-2 of pixels to be deactivated when the position of the second housing 720 with respect to the first housing 710 is the second position.

In operation 930, the processor 280 may deactivate the second set 732-2 of pixels among the pixels in the first region 732, and may activate the remaining pixels except for the second set 732-2 of pixels based on identifying the second set 732-2 of pixels.

Figure 10:
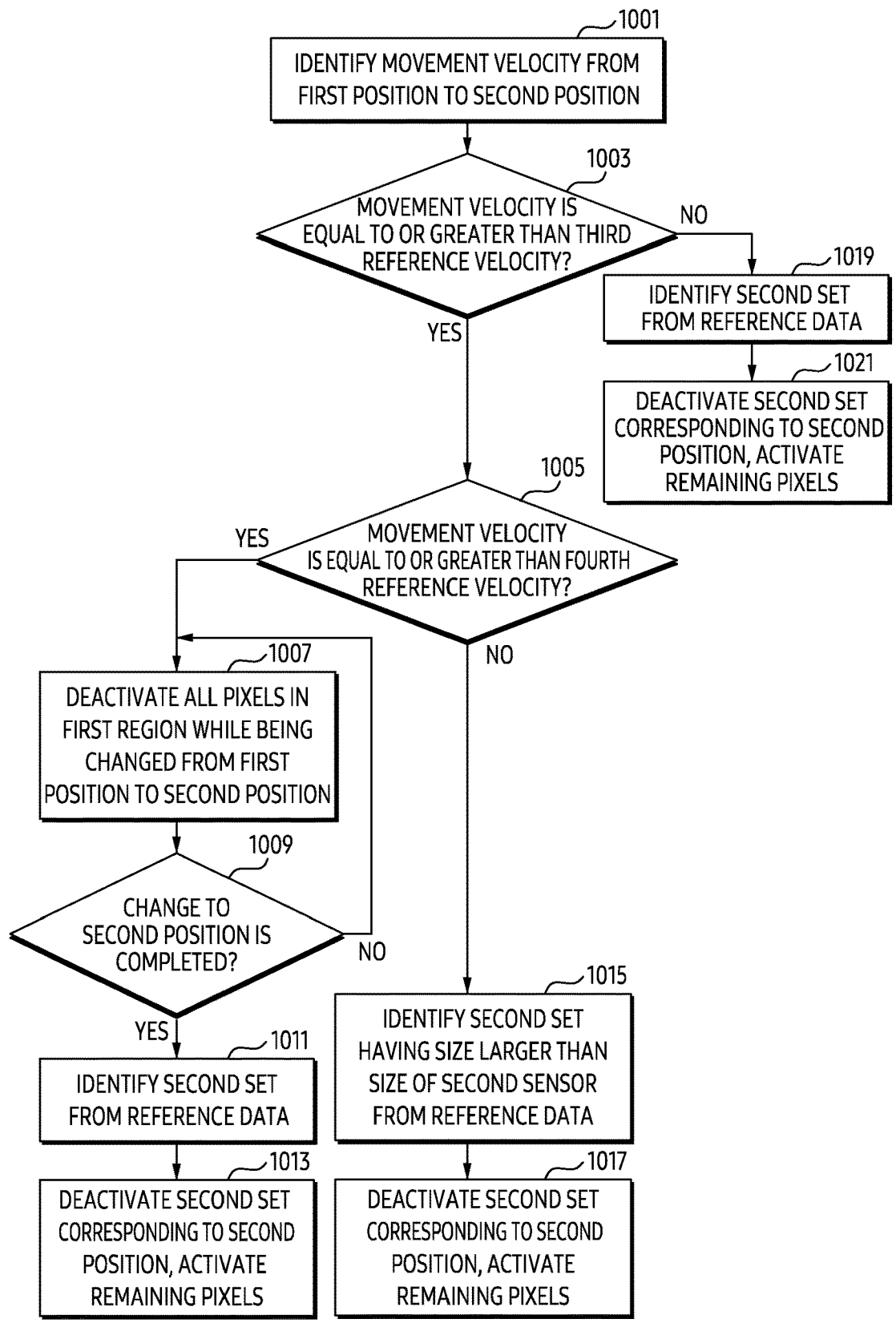
FIG. 10 illustrates an example of an operation of a processor of an example electronic device, according to an embodiment.

FIG. 10 illustrates an example of an operation of a processor of an example electronic device, according to an embodiment.

The operations of FIG. 10 may be performed by an electronic device 700 of FIG. 7 and/or FIG. 8.

Referring to FIG. 10, in operation 1001, the processor (e.g., a processor 280 of FIG. 2C) may identify a change in position of a second housing (e.g., a second housing 720 of FIG. 7) with respect to a first housing (e.g., a first housing 710 of FIG. 7) through a first sensor (e.g., a first sensor 250 of FIG. 2C). The processor 280 may identify a moving velocity of the second housing 720 with respect to the first housing 710.

In operation 1003, the processor 280 may identify whether the velocity of the second housing 720 with respect to the first housing 710 is equal to or greater than a third reference velocity. For example, the processor 280 may identify whether a velocity of position change of the second housing 720 with respect to the first housing 710 identified through the first sensor 250 is equal to or greater than a third velocity recorded in a memory (e.g., a memory 270 of FIG. 2C).

In operation 1005, the processor 280 may identify whether the moving velocity of the second housing 720 with respect to the first housing 710 is equal or greater than a fourth reference velocity. The fourth reference velocity may refer to a velocity greater than the third reference velocity. For example, the processor 280 may identify whether the moving velocity of the second housing 720 with respect to the first housing 710 identified through the first sensor 250 is equal to or greater than the fourth reference velocity recorded in the memory 270.

In operation 1007, based on identifying that the moving velocity of the second housing 720 with respect to the first housing 710 is equal to or greater than the fourth reference velocity, while a position of the second housing 720 with respect to the first housing 710 is changed from a first position to a second position, the processor 280 may deactivate all pixels in a first region (e.g., a first region 732 of FIG. 7). For example, when the position of the second housing 720 with respect to the first housing 710 is the first position, the processor 280 may deactivate a first set of pixels (e.g., a first set 732-1 of pixels of FIG. 8) overlapping a second sensor (e.g., a second sensor 760 of FIG. 7) among pixels of the first region 732. Based on identifying that the moving velocity of the second housing 720 with respect to the first housing 710 is equal to or greater than the fourth reference velocity, the processor 280 may deactivate all pixels in the first region 732 including the first set 732-1 of pixels.

According to an embodiment, based on identifying that the moving velocity of the second housing 720 with respect to the first housing 710 is equal to or greater than the fourth reference velocity, while the position of the second housing 720 with respect to the first housing 710 is changed from the first position to the second position, the processor 280 may refrain from identifying a second set of pixels (e.g., a second set 732-2 of pixels of FIG. 8). For example, based on identifying that the moving velocity of the second housing 720 with respect to the first housing 710 is equal to or greater than the fourth reference velocity, while the position of the second housing 720 with respect to the first housing 710 is changed from the first position to the second position, the processor 280 may bypass identifying the second set 732-2 of pixels. For another example, based on identifying that the moving velocity of the second housing 720 with respect to the first housing 710 is equal to or greater than the fourth reference velocity, while the position of the second housing 720 with respect to the first housing 710 is changed from the first position to the second position, the processor 280 may omit identifying the second set 732-2 of pixels.

In operation 1009, the processor 280 may identify whether movement of the second housing 720 with respect to the first housing 710 has been completed. For example, the processor 280 may identify that the movement of the second housing 720 with respect to the first housing 710 is completed based on identifying that the movement of the second housing 720 with respect to the first housing 710 is stopped.

In operation 1011, the processor 280 may identify the second set 732-2 of pixels corresponding to the second position based on identifying that the movement of the second housing 720 with respect to the first housing 710 has been completed.

In operation 1013, based on identifying the second set 732-2 of pixels, the processor 280 may deactivate the second set 732-2 of pixels among the pixels in the first region 732, and may activate the remaining pixels except for the second set 732-2 of pixels.

In operation 1015, based on identifying that the moving velocity of the second housing 720 with respect to the first housing 710 is equal to or greater than the third reference velocity and less than the fourth reference velocity, the processor 280 may identify the second set 732-2 of pixels having a size larger than that of the second sensor 760. For example, based on identifying that the moving velocity of the second housing 720 with respect to the first housing 710 is equal to or greater than the third reference velocity and less than the fourth reference velocity, the processor 280 may identify the second set 732-2 of pixels having a size larger than that of the second sensor 760 from reference data. According to an embodiment, when the moving velocity of the second housing 720 with respect to the first housing 710 is equal to or greater than the third reference velocity and less than the fourth reference velocity, as the moving velocity of the second housing 720 increases, a size of the second set 732-2 of pixels identified by the processor 280 may increase. For example, based on identifying that a velocity of change is a fourth velocity, the processor 280 may identify the second set 732-2 of pixels having a third size. For example, based on identifying that the velocity of change is a fifth velocity greater than the fourth velocity, the processor 280 may identify the second set 732-2 of pixels having a fourth size larger than the third size. Each of the fourth velocity and the fifth velocity may have a value greater than or equal to the third reference velocity and less than the fourth reference velocity.

In operation 1017, based on identifying the second set 732-2 of pixels larger than a size of the second sensor 760, the processor 280 may deactivate the second set 732-2 of pixels, and may activate the remaining pixels except for the second set 732-2 of pixels.

In operation 1019, based on identifying that the moving velocity of the second housing 720 with respect to the first housing 710 is less than the third reference velocity, the processor 280 may identify the second set 732-2 of pixels from reference data recorded in the memory 270.

In operation 1021, based on identifying the second set 732-2 of pixels, the processor 280 may deactivate the second set 732-2 of pixels, and may activate the remaining pixels except for the second set 732-2 of pixels.

According to an embodiment, an electronic device (e.g., an electronic device 200 of FIG. 2A and FIG. 2C) may comprise a first housing (e.g., a first housing 210 of FIG. 2A) including a first surface (e.g., a first surface 211 of FIG. 2A) and a second surface (e.g., a second surface 212 of FIG. 2A) opposite to the first surface. According to an embodiment, the electronic device may comprise a second housing (e.g., the second housing 220 of FIG. 2A) including a third surface (e.g., the third surface 221 of FIG. 2A) and a fourth surface (e.g., the fourth surface 222 of FIG. 2A) opposite to the third surface. According to an embodiment, the electronic device may comprise a hinge structure (e.g., the hinge structure 240 of FIG. 2A) rotatably connecting the first housing and the second housing. According to an embodiment, the electronic device may comprise a flexible display (e.g., a flexible display 230 of FIG. 2A) including a display region (e.g., a display region 231 of FIG. 2A) including a first region (e.g., a first region 232 of FIG. 2A) including pixels with a first density and a second region (e.g., the second region 233 of FIG. 2A) including pixels with a second density higher than the first density and surrounding the first region, and disposed on the first surface and the third surface across the hinge structure. According to an embodiment, the electronic device may comprise a first sensor (e.g., a first sensor 250 of FIG. 2C), a second sensor (e.g., a second sensor 260 of FIG. 2C) within the first housing disposed below the first region; and a processor (e.g., a processor 280 of FIG. 2C). According to an embodiment, the processor may identify, through the first sensor, an angle between the first surface and the third surface is changed from a first angle to a second angle, while a first set of pixels (e.g., the first set 232-1 of the pixels of FIG. 3) among the pixels in the first region is disabled for driving the second sensor. According to an embodiment, the processor may identify a second set of pixels (e.g., a second set 232-2 of pixels of FIG. 3) corresponding to the second angle among the pixels in the first region, from a reference data for an alignment between the second sensor and the pixels to be disable in the first region moved with respect to the second sensor according to change of the angle. According to an embodiment, the processor may be configured to deactivate the identified the second set of pixels and activate remaining pixels except for the second set of pixels among the pixels in the first region.

According to an embodiment, the reference data may include a plurality of reference sets (e.g., a plurality of reference sets 235 of FIG. 3) respectively corresponding to a plurality of reference angles within a range in which the angle is changeable.

According to an embodiment, the processor, in response to identifying the angle is different from the plurality of reference angles and is between a first reference angle (e.g., a first reference angle a1 of FIG. 4) and a second reference angle (e.g., a second reference angle a2 of FIG. 4) among the plurality of reference angles, based on a first reference set (e.g., a first reference set 235-1 of FIG. 4) corresponding to the first reference angle and a second reference set (e.g., a second references set 235-2 of FIG. 4) corresponding to the second reference angle among the plurality of reference set, may obtain a third set of pixels (e.g., a third set 232-3 of pixels of FIG. 4) in the first region distinct from the plurality of reference sets.

According to an embodiment, the processor may identify a first weight to be applied to the first reference set and a second weight to be applied to the second reference set, based on a difference between the first reference angle and the second angle and a difference between the second reference angle and the second angle. According to an embodiment, the processor may obtain the third set, based on the first weight, the second weight, a position of the first reference set and a position of the second reference set. According to an embodiment, the processor may be configured to identify the obtained third set as the second set.

According to an embodiment, the second sensor may include an image sensor. According to an embodiment, a function identifying the third set distinct from the plurality of reference sets may be executed based on identifying a change in the angle while video is obtained through the second sensor.

According to an embodiment, the second sensor may include an image sensor. According to an embodiment, a function identifying the second set from the reference data may be executed based on at least a part of driving of the second sensor for obtaining image.

According to an embodiment, the second sensor may be driven in response to an input to an executable object for executing software application providing use of the second sensor, displayed in the display region.

According to an embodiment, the second sensor may be driven in response to an input to an executable object for executing a function providing use of the second sensor, displayed in a user interface of a software application in the display region.

According to an embodiment, the second sensor may be driven in response to a user input pressing a physical button disposed on the first housing or the second housing.

According to an embodiment, the processor may identify a velocity of the change from the first angle to the second angle. According to an embodiment, based on identifying the velocity is less than a reference velocity, the processor may identify the second set from the reference data, may deactivate the second set, and may activate the remaining pixels. According to an embodiment, based on identifying the velocity is equal to or greater than the reference velocity, the processor may be configured to deactivate all pixels of the first region while the angle is changed from the first angle to the second angle.

According to an embodiment, the processor may be further configured to, based on identifying the velocity is equal to or greater than the reference velocity, bypass identifying the second set.

According to an embodiment, the processor may be configured to, based on identifying the change to the second angle is completed, identify the second set corresponding to the second angle.

According to an embodiment, the flexible display may be foldable based on a folding axis (e.g., a folding axis f of FIG. 2A) by a movement of the second housing with respect to the first housing. According to an embodiment, a first distance that is a width (e.g., a first width w1 of FIG. 2A)) perpendicular to the folding axis of the first region may be longer than a second distance that is a width (e.g., a second width w2 of FIG. 2A)) parallel to the folding axis of the first region.

According to an embodiment, the second sensor may be disposed at a position corresponding to a position of a one end (e.g., one end 232a of the first region 232 of FIF. 2A) of the first region within an unfolded state in which a first direction the first surface faces a second direction the third surface faces are same each other. According to an embodiment, the second sensor may be disposed at a position corresponding to a position of the other end (e.g., the other end 232b of the first region 232 of FIG. 2A) of the first region within a folded state in which the first direction and the second direction are opposite to each other.

According to an embodiment, the display may be changed by the movement of the second housing with respect to the first housing.

According to an embodiment, an electronic device (e.g., an electronic device 700 of FIG. 7) may include a first housing (e.g., the first housing 710 of FIG. 7), and a second housing (e.g., the second housing 720 of FIG. 7) coupled to the first housing to be slidable with respect to the first housing. According to an embodiment, the electronic device (e.g., an electronic device 700 of FIG. 7) may include a flexible display (e.g., a flexible display 730 of FIG. 7) including a display region (e.g., a display region 731 of FIG. 7) including a first region (e.g., a first region 732 of FIG. 7) including pixels with a first density and a second region (e.g., a second region 733 of FIG. 7) including pixels with a second density higher than the first density and surrounding the first region, and a flexible display in which the display region is contracted according to the slide-in of the second housing with respect to the first housing or expanded according to the slide-out of the second housing with respect to the first housing. According to an embodiment, the electronic device may include a first sensor (e.g., the first sensor 250 of FIG. 2C), a second sensor (e.g., a second sensor 760 of FIG. 7) disposed below the first region within the second housing; and a processor (e.g., a processor 280 of FIG. 2C). According to an embodiment, the processor may identify that the position of the second housing with respect to the first housing is changed from the first position to the second position through the first sensor while a first set of pixels (e.g., a first set of pixels of FIG. 8) among the pixels in the first region is disabled for driving the second sensor. According to an embodiment, the processor may identify a second set of pixels (e.g., a second set 732-2 of pixels of FIG. 8) corresponding to the second position among the pixels in the first region from a reference data for an alignment between the second sensor and the pixels to be disable in the first region moved with respect to the second sensor according to change of the position. According to an embodiment, the processor may be configured to deactivate the identified the second set of pixels and activate remaining pixels except for the second set of pixels among the pixels in the first region.

According to an embodiment, the reference data may include a plurality of reference sets respectively corresponding to a plurality of reference distance within a moving range of the second housing with respect to the first housing.

According to an embodiment, the processor may identify a velocity of the movement of the second housing with respect to the first housing. According to an embodiment, based on identifying the velocity is less than a reference velocity, the processor may identify the second set from the reference data, may deactivate the second set, and may activate the remaining pixels. According to an embodiment, based on identifying the velocity is equal to or greater than the reference velocity, the processor may be configured to deactivate all pixels of the first region while the position is changed from the first position to the second position.

According to an embodiment, a curvature of the flexible display may be changed by the movement of the second housing with respect to the first housing.

According to an embodiment, a third distance of a width (e.g., a third width w3 of FIG. 8) parallel to a moving direction of the second housing in the first region may be longer than a fourth distance of a width (e.g., a fourth width w4 of FIG. 8) perpendicular to the moving direction of the second housing in the first region.

The electronic device according to various embodiments disclosed in the present document may be various types of devices. The electronic device may include, for example, a portable communication device (e.g., a smartphone), a computer device, a portable multimedia device, a portable medical device, a camera, a wearable device, or a home appliance. The electronic device according to an embodiment of the present document is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "first", "second", or "second", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

Various embodiments of the present document may be implemented as software (e.g., a program) including one or more instructions stored in a storage medium (or external memory) readable by a device (e.g., wearable device 100). For example, a processor (e.g., a processor) of a device (e.g., wearable device 100) may call and execute at least one of the one or more instructions stored from a storage medium. This makes it possible for the device to operate to perform at least one function according to at least one command called. The one or more instructions may include code generated by a compiler or code that may be executed by an interpreter. The device-readable storage medium may be provided in the form of a non-transitory storage medium. Here, the term 'non-transitory' only means that a storage medium is a device that is tangible and does not include a signal (e.g., electromagnetic wave), and the term does not distinguish between a case where data is semi-permanently stored and a case where it is temporarily stored.

According to an embodiment, a method according to various embodiments disclosed in the present document may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects, and some of the plurality of objects may be separated and disposed in other components. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of each of the components in the same or similar manner as those performed by the corresponding component among the plurality of components before the integration. According to various embodiments, operations performed by a module, a program, or other components may be executed sequentially, in parallel, repeatedly, or heuristic, performed in a different order, omitted, or one or more other operations may be added.

What is claimed is:

1. An electronic device including:
 a first housing;
 a second housing slidable with respect to the first housing;
 a flexible display including a display region including a first region including pixels with a first density and a second region including pixels with a second density higher than the first density and surrounding the first region, the display region being contracted when the second housing slides into the first housing and being expanded when the second housing slides out from the first housing,
 a first sensor;
 a second sensor disposed below the first region within the second housing;
 at least one processor comprising processing circuitry; and
 memory, storing instructions, comprising one or more storage media,
 wherein the instructions, when executed by the at least one processor individually or collectively, cause the electronic device to:
  identify a position change of the second housing with respect to the first housing from a first position to a second position through the first sensor while a first set of pixels among the pixels in the first region is deactivated for driving the second sensor,
  identify a second set of pixels corresponding to the second position among the pixels in the first region from a reference data for an alignment between the second sensor and the pixels in the first region moved with respect to the second sensor according to change of the position; and
  deactivate the second set of pixels and activate remaining pixels except for the second set of pixels among the pixels in the first region.

2. The electronic device of claim 1,
 wherein the reference data includes a plurality of reference sets respectively corresponding to a plurality of reference distances within a moving range of the second housing with respect to the first housing.

3. The electronic device of claim 1,
 wherein the instructions, when executed by the at least one processor individually or collectively, further cause the electronic device to:

identify a velocity of movement of the second housing with respect to the first housing, based on identifying the velocity is less than a reference velocity, identify the second set from the reference data, deactivate the second set, and activate the remaining pixels, and based on identifying the velocity is equal to or greater than the reference velocity, deactivate all pixels of the first region while the position is changed from the first position to the second position.

4. The electronic device of claim 1,
wherein a curvature of the flexible display is changed by movement of the second housing with respect to the first housing.

5. The electronic device of claim 1,
wherein a first width of the first region parallel to a moving direction of the second housing is longer than a second width of the first region perpendicular to the moving direction of the second housing.

6. An electronic device comprising:
a first housing;
a second housing rotatably coupled to the first housing;
a flexible display, disposed on the first housing and the second housing, including a display region, the display region including:
  a first region, including pixels with a first density, disposed on the first housing, and
  a second region, including pixels with a second density higher than the first density, surrounding the first region;
a first sensor;
a second sensor within the first housing disposed below the first region; and
at least one processor comprising processing circuitry; and
memory, storing instructions, comprising one or more storage media,
wherein the instructions, when executed by the at least one processor individually or collectively, cause the electronic device to:
  drive the second sensor;
  while driving the second sensor, detect, through the first sensor, changing of an angle between the first housing and the second housing; and
  based on the detected changing of the angle, at least partially change a portion of the pixels in the first region deactivated for driving the second sensor.

7. The electronic device of claim 6,
wherein the instructions, when executed by the at least one processor individually or collectively, further cause the electronic device to:
  while driving the second sensor, deactivate first pixels among the pixels in the first region that are aligned with the second sensor;
  while driving the second sensor and deactivate the first pixels, detect, through the first sensor, the changing of the angle from a first angle to a second angle; and
  based on the detected changing of the angle from the first angle to the second angle, change the portion of the pixels in the first region deactivated for driving the second sensor, by:
    identifying second pixels among the pixels in the first region that are aligned with the second sensor when the angle is the second angle, and
    deactivating the second pixels among the pixels in the first region.

8. The electronic device of claim 7,
wherein the second pixels includes a portion of the pixels that is aligned with the second sensor when the angle is the second angle.

9. The electronic device of claim 7,
wherein the instructions, when executed by the at least one processor individually or collectively, further cause the electronic device to:
  identify, from a reference data including a plurality of reference sets respectively corresponding to a plurality of reference angles within a range in which the angle is changeable, the second pixels of the pixels in the first region aligned with the second sensor according to the changing of the angle.

10. The electronic device of claim 9,
wherein the instructions, when executed by the at least one processor individually or collectively, further cause the electronic device to:
  in response to identifying the angle is different from the plurality of reference angles and is between a first reference angle and a second reference angle among the plurality of reference angles, identify, based on a first reference set corresponding to the first reference angle and a second reference set corresponding to the second reference angle among the plurality of reference sets, a third pixels in the first region distinct from the plurality of reference sets as the second pixels.

11. The electronic device of claim 10,
wherein the instructions, when executed by the at least one processor individually or collectively, further cause the electronic device to:
  identify a first weight to be applied to the first reference set and a second weight to be applied to the second reference set, based on a difference between the first reference angle and the second angle and a difference between the second reference angle and the second angle; and
  identify the third pixels as the second pixels, based on the first weight, the second weight, a position of the first reference set and a position of the second reference set.

12. The electronic device of claim 6,
wherein the second sensor is driven in response to an input to an executable object for executing a software application providing use of the second sensor, the executable object being displayed in the display region.

13. The electronic device of claim 6,
wherein the second sensor is driven in response to an input to an executable object for executing a function providing use of the second sensor, the executable object being displayed in a user interface of a software application in the display region.

14. The electronic device of claim 6,
wherein the second sensor is driven in response to a user input pressing a physical button disposed on the first housing or the second housing.

15. The electronic device of claim 6,
wherein, the instructions, when executed by the at least one processor individually or collectively, further cause the electronic device to:
  detect, through the first sensor, the changing of the angle from a first angle to a second angle, while a first pixels corresponding to the first angle among the pixels in the first region is deactivated;
  identify, from a reference data, a second pixels corresponding to the second angle among the pixels in the first region, aligned with respect to the second sensor according to changing of the angle; and deactivate the second pixels and activate remaining pixels among the pixels in the first region.

16. The electronic device of claim 15, wherein the instructions, when executed by the at least one processor individually or collectively, further cause the electronic device to:

identify a velocity of the changing from the first angle to the second angle;

based on identifying the velocity is less than a reference velocity, identify the second pixels from the reference data, deactivate the second pixels and activate the remaining pixels; and based on identifying the velocity is equal to or greater than the reference velocity, deactivate all pixels of the first region while the angle is changed from the first angle to the second angle.

17. The electronic device of claim 16, wherein the instructions, when executed by the at least one processor individually or collectively, further cause the electronic device to:

based on identifying the velocity is equal to or greater than the reference velocity, refrain from identifying the second pixels.

18. The electronic device of claim 6, wherein the flexible display is foldable based on a folding axis by a movement of the second housing with respect to the first housing, and wherein a first width of the first region perpendicular to the folding axis is longer than a second width of the first region parallel to the folding axis.

19. The electronic device of claim 18, wherein the first housing includes a first surface and a second surface opposite to the first surface;

wherein the second housing includes a third surface and a fourth surface opposite to the third surface;

wherein the flexible display is disposed on the first surface and the third surface; and wherein the second sensor is overlapped to one end of the first region in an unfolded state in which a first direction that the first surface faces and a second direction that the third surface faces are the same and is overlapped to another end of the first region in a folded state in which the first direction and the second direction are opposite to each other.

20. The electronic device of claim 6, wherein a curvature of the flexible display is changed by movement of the second housing with respect to the first housing.

* * * * *